US009439222B2

(12) United States Patent
Liang et al.

(10) Patent No.: US 9,439,222 B2
(45) Date of Patent: Sep. 6, 2016

(54) METHOD, BASE STATION, AND USER EQUIPMENT FOR ACCESSING PHYSICAL RANDOM ACCESS CHANNEL

(71) Applicant: Huawei Technologies Co., Ltd., Shenzhen, Guangdong (CN)

(72) Inventors: Yongming Liang, Shanghai (CN); Jiayin Zhang, Shanghai (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 609 days.

(21) Appl. No.: 13/793,849

(22) Filed: Mar. 11, 2013

(65) Prior Publication Data

US 2013/0286958 A1     Oct. 31, 2013

Related U.S. Application Data

(63) Continuation of application No. PCT/CN2012/076040, filed on May 25, 2012.

(30) Foreign Application Priority Data

Feb. 1, 2012 (CN) .......................... 2012 1 0022501

(51) Int. Cl.
*H04W 74/08* (2009.01)
*H04J 11/00* (2006.01)

(52) U.S. Cl.
CPC ...... *H04W 74/0833* (2013.01); *H04J 11/0069* (2013.01); *H04W 74/0866* (2013.01); *H04J 2211/001* (2013.01)

(58) Field of Classification Search
CPC ................... H04W 74/0833; H04W 74/0866; H04W 56/0005; H04W 28/0284; H04J 11/0069; H04J 2211/001
USPC ....................................................... 370/329
See application file for complete search history.

(56) References Cited

U.S. PATENT DOCUMENTS

2009/0046629 A1* 2/2009 Jiang .................... H04J 13/0059
370/328
2009/0109919 A1* 4/2009 Bertrand ............. H04L 27/2633
370/330
(Continued)

FOREIGN PATENT DOCUMENTS

CN        101005308 A     7/2007
CN        101115304 A     1/2008
(Continued)

OTHER PUBLICATIONS

International Search Report and Written Opinion of the International Searching Authority dated Nov. 8, 2012 in connection International Patent Application No. PCT/CN2012/076040.
(Continued)

*Primary Examiner* — Huy D Vu
*Assistant Examiner* — Nizam Ahmed

(57) ABSTRACT

A method, a base station, and a user equipment for PRACH access are provided. The method includes: determining a PRACH sequence group used by multiple base stations, where the multiple base stations use a same cell identity and include a macro base station and at least one pico base station, the PRACH sequence group includes k1 first PRACH sequences, k2second PRACH sequences, k3 third PRACH sequences, k4 fourth PRACH sequences, k5 fifth PRACH sequences, and k6 sixth PRACH sequences, k1 and k4 are positive integers, and k2, k3, k5, and k6 are non-negative integers; and sending an indication parameter of the PRACH sequence group to the UE for the UE to randomly access a network, where the indication parameter is used for indicating the first PRACH sequences to the sixth PRACH sequences. thereby the fierceness of contention access to a PRACH can be reduced.

35 Claims, 12 Drawing Sheets

(56) References Cited

U.S. PATENT DOCUMENTS

| | | | |
|---|---|---|---|
| 2009/0268666 A1 | 10/2009 | Vujcic | |
| 2010/0226295 A1 | 9/2010 | Sun et al. | |
| 2011/0249549 A1* | 10/2011 | Hao et al. | 370/208 |
| 2013/0039195 A1* | 2/2013 | Weng et al. | 370/252 |
| 2013/0083749 A1* | 4/2013 | Xu et al. | 370/329 |
| 2013/0250847 A1* | 9/2013 | Lee et al. | 370/315 |
| 2014/0112254 A1* | 4/2014 | Lindoff | H04W 74/002 370/328 |
| 2014/0321406 A1* | 10/2014 | Marinier et al. | 370/329 |

FOREIGN PATENT DOCUMENTS

| | | |
|---|---|---|
| CN | 101772183 A | 7/2010 |
| CN | 102231917 A | 11/2011 |
| EP | 1 134 992 A1 | 9/2001 |
| EP | 1134992 A1 * | 9/2001 ............ H04W 52/04 |
| EP | 2 053 757 A1 | 4/2009 |
| JP | EP 2053757 A1 * | 4/2009 .......... H04J 13/0062 |
| WO | WO 2008/111821 A1 | 9/2008 |
| WO | WO 2011/084033 A2 | 7/2011 |

OTHER PUBLICATIONS

"PRACH Enhancement and UL Power Control for CoMP Scenario 4", Research in Motion, UK Limited, 3GPP TSG RAN WG1 Meeting #66, Aug. 22-26, 2011, 6 pages.

"RACH enhancement for uplink CoMP", New Postcom, 3GPP TSG RAN WG1 Meeting #67, Nov. 14-18, 2011, 4 pages.

\* cited by examiner

LTE Rel-8/9/10

Group A: {0, 1, ..., sizeOfRA-PreamblesGroupA - 1}
Group B: {sizeOfRA-PreamblesGroupA, ..., numberOfRA-Preambles - 1}
Non-contention based PRACH sequence: {numberOfRA-Preambles, ..., 64}

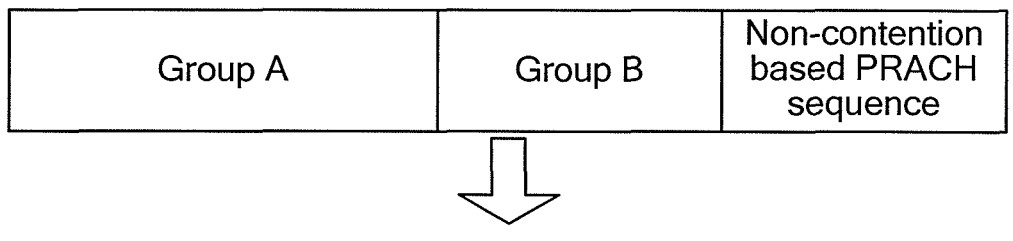

LTE Rel-11/12

Group A_1: {0, 1, ..., sizeOfRA-PreamblesGroupA - 1}
Group B_1: {sizeOfRA-PreamblesGroupA, ..., numberOfRA-Preambles - 1}
Non-contention based PRACH sequence: {numberOfRA-Preambles, ..., 64}

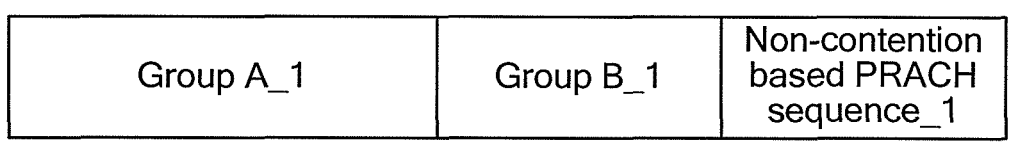

Group A_2: {0, 1, ..., sizeOfRA-PreamblesGroupA- 1}
Group B_2: {sizeOfRA-PreamblesGroupA, ..., numberOfRA-Preambles - 1 }
Non-contention based PRACH sequence: {numberOfRA-Preambles, ..., 64}

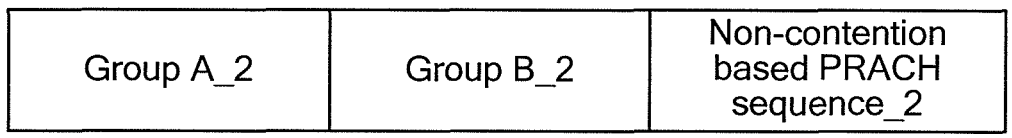

FIG. 7

Group A_Macro: {0, 1, ..., sizeOfRA-PreamblesGroupA_Macro - 1}
Group B_Macro: {sizeOfRA-PreamblesGroupA_Macro, ..., numberOfRA-Preambles_Macro - 1}
Non-contention based PRACH sequence_Macro: {numberOfRA-Preambles_Macro, ..., N-1}

| Group A_Macro | Group B_Macro | Non-contention based PRACH sequence_Macro | Group A_Pico |
|---|---|---|---|

0                                                             N-1         63

Group A_Pico: {N, N+1, 64, ..., sizeOfRA-PreamblesGroupA_Pico -(63-N)- 1}
Group B_Pico: {sizeOfRA-PreamblesGroupA_Pico-(63-N), ..., numberOfRA-Preambles_Pico - 1}
Non-contention based PRACH sequence_Pico: {numberOfRA-Preambles_Pico, ..., 127}

| Group A_Pico | Group B_Pico | Non-contention based PRACH sequence_Pico |
|---|---|---|

Group A_Macro: {0, 1, ..., sizeOfRA-PreamblesGroupA_Macro – 1}
Group B_Macro: {sizeOfRA-PreamblesGroupA_Macro, ..., numberOfRA-Preambles_Macro – 1}
Non-contention based PRACH sequence_Macro: {numberOfRA-Preambles_Macro, ..., N-1}

| Group A_Macro, Group A_Pico | Group B_Macro, Group B_Pico | Non-contention based PRACH sequence_Macro, non-contention based PRACH sequence_Pico |
|---|---|---|

0                                                                         63

| Group A_Pico | Group B_Pico | Non-contention based PRACH sequence_Pico |
|---|---|---|

PRACH Group-1: RAPIDs={0, 1, ..., 63}
PRACH Group-2: RAPIDs={64, 65, ..., 127}
PRACH Group-3: RAPIDs={128, 129, ..., 191}
PRACH Group-L: RAPIDs={0, 1, ..., 63} + (L - 1) × 64

METHOD, BASE STATION, AND USER EQUIPMENT FOR ACCESSING PHYSICAL RANDOM ACCESS CHANNEL

CROSS-REFERENCE TO RELATED APPLICATIONS

This application is a continuation of International Application No. PCT/CN2012/076040, filed on May 25, 2012, which claims priority to Chinese Patent Application No. 201210022501.0, filed on Feb. 1, 2012, both of which are hereby incorporated by reference in their entireties.

TECHNICAL FIELD

Embodiments of the present invention relate to the field of network communication technologies, and in particular, to a method, a base station, and a user equipment for accessing a physical random access channel (PRACH).

BACKGROUND

In the 63th conference of the 3rd Generation Partnership Project (3GPP) RAN1 for a cellular communication system, four coordinated multi-point transmission (CoMP,) schemes are defined. In a third CoMP scheme, at a transfer node that includes a Macro Site and a radio remote head (RRH) and is in a macro base station area, one cell ID is allocated to each RRH, respectively, and such a structure is similar to a system where multiple base stations coexist. However, in a fourth CoMP scheme, a same cell ID is shared by all transfer nodes that include a macro base station and a radio remote head and is in a macro base station area, and the architecture is also referred to as a distributed antenna system (DAS).

In a 3GPP LTE-Release-11 system, to further enhance the throughput of DL (Downlink) and UL (Uplink) data transmission, solutions such as DL CoMP, UL CoMP, DL MIMO enhancement (Downlink Multiple Input Multiple Output enhancement), and HetNet (Heterogeneous Network) are adopted to greatly enhance data throughput of radio cell DL/UL, throughput at the edge of the radio cell, and user experience at the edge, for example, QoS (Quality of Service). However, the capacity of the existing DL and UL signaling mechanism in an LTE Release-11 system is insufficient to support the enhanced DL and UL data throughput. Therefore, in the current 3GPP LTE conference, an enhanced DL and UL signaling mechanism is described and adopted to expand the DL and UL signaling capacity, so as to support the enhanced DL and UL data throughput. Specifically, the enhanced DL and UL signaling mechanism includes an enhanced PDCCH (ePDCCH, enhanced physical downlink control channel), an enhanced PUCCH (Physical uplink control channel), an enhanced PRACH, an enhanced TA (Timing advance), an enhanced PHICH (Physical HARQ indicator channel), an enhanced PCFICH (Physical control frame indicator channel), an enhanced PBCH (Physical broadcast channel), and so on. At present, key points of discussions in the 3GPP LTE conference is the ePDCCH, the enhanced PUCCH, and the enhanced DL TA and UL TA. Nevertheless, considering that in an LTE Release-8/9/10 system, an RRH mechanism is not adopted and the number of user equipments (UE) is limited, and a PRACH resource is sufficient for a limited number of UEs to access the macro base station, while in an LTE Release-11 system, especially, multiple RRHs are introduced in a CoMP solution 4, so that a coverage of the radio cell expands greatly and the number of serving UEs increases largely, which may result in the existing PRACH resource of the LTE Release-8/9/10 system is insufficient for a large number of UEs to access the macro base station and/or one and/or more RRHs. Therefore, the PRACH resource needs to be further expanded.

Random access is a most basic function of a cellular system, which makes it possible to establish a connection between a UE and a network. The random access is initiated and the resource is adopted randomly, and of course the access also succeeds randomly. A scheme of random access is as follows:

Random access in a contention-based mode: an initial access in an RRC_IDLE status; an initial access after an error occurs on a radio link; in an RRC_CONNECTED status, when there is uplink data transmission, for example, after an uplink is non-synchronized, or no PUCCH resource is used for sending a scheduling request message, that is, in this case, except for a random access manner, there is no other way to inform an eNB that the UE has uplink data that needs to be sent.

Random access in a non-contention-based mode: in the RRC_CONNECTED status, when there is downlink data transmission, the uplink is non-synchronized. The data transmission further requires confirmation in addition to reception, and therefore, if the uplink is non-synchronized, the eNB cannot guarantee that confirmation information of the UE can be received. In this case, the downlink is still synchronized, and therefore, the UE can be informed through a downlink message of a resource, for example, a preamble sequence (or referred to as a "PRACH sequence" or a "preamble") and sending timing, that needs to be used for initiating random access. Because these resources are known to both parties, the system does not need to be accessed through a contention manner. For the random access in a switching process, during the switching process, a target eNB may inform the UE through a serving eNB of the resource that it can use; whether it is contention-based lies in whether in that case a terminal can intercept a downlink control channel information transferred by the eNB, so as to acquire a specific resource to be used for transmitting an uplink preamble, and definitely, the judgment is made by the eNB rather than deciding by the UE itself.

A process of initializing a random access process is as follows: The random access process may be triggered by a PDCCH order or a MAC (Media Access Control) sublayer. If one PDCCH transmission received by the UE includes one PDCCH order, the UE initiates one random access process. The PDCCH order or an RRC message indicates ra-PreambleIndex and ra-PRACH-MaskIndex information to inform the UE of the preamble sequence and a sending opportunity that the UE can use.

Before the random access process is initiated, the following information is provided:

The PRACH resource which is used for sending a random access preamble is prepared, which is indicated by prach-ConfigIndex; there is an available random access preamble, and two groups of random access preambles may be set at a MAC layer: Group B and Group A, which are used for indicating the size of an MSG3 (message 3) that is sent, respectively, the number of preamble sequences of Group B can be deduced and obtained from the following parameters, the number of preamble sequences of Group B=numberOfRA-Preambles−sizeOfRA-PreamblesGroupA. In SIB2, the foregoing two parameters are provided in the defined PRACH radio resource. If the preamble sequences of Group A are equal to the total random access preamble sequences, the UE knows that there is no preamble sequence of Group B. Serial numbers of the preamble sequences of Group A and Group B are as follows: [0 sizeOfRA-PreamblesGroupA−1] and [sizeOfRA-PreamblesGroupA numberOfRA-Preambles−1]. The UE select Group A or selects Group B depending on whether it is needed and a certain condition is satisfied. For example, the UE intends to carry a VoIP (Voice over Internet Protocol) packet in the MSG3 that is sent, naturally the needed resource is a bit large, so that when preamble sequences which are sent by the UE and received by the eNB belong to Group B, it allocates more resource to the UE to send the MSG3. If there is preamble sequences of Group B, because an MSG3 message corresponding to Group B is relatively large, some additional requirements must be satisfied, and whether the preamble sequences of Group A or Group B are selected depends on some values and a current UE power condition, where these values are messagePowerOffsetGroupB, messageSizeGroupA, the configured UE transmit power PCMAX, and a power offset between the preamble sequences and the MSG3. A window size parameter ra-ResponseWindowSize of receiving a random access response is acquired, and the UE intercepts during this window period whether the eNB return a response to it. This response carries the resource which is used for sending the MSG3 and is allocated to the UE by the eNB. Therefore, the window size is the time that the UE waits. If no response is received, the UE determines that the preamble it sent is not received by the eNB, and subsequent processing is needed, for example, a power ramping step powerRampingStep. It is assumed that an access process initiated in the foregoing fails, but the maximum number of attempts is not reached, the UE increases the power to send preambles next time to enhance an opportunity of successful sending. The number of times that the sending can be attempted is preambleTransMax, it is usually considered that the UE accesses the network when this number of times is exceeded, and at least it can be considered that the access fails and the access failure is reported to an upper-layer protocol layer. The eNB expects the received preamble sequence target power preambleInitialReceivedTargetPower, and interference is caused if this value is too high and the preamble sequences may be unable to be received if the value is too low. A preamble sequence format corresponds to the power offset, and at present there are five types of preamble sequences, and each format corresponds to one reference selection transmit power. The maximum number of times of MSG3 HARQ retransmission is maxHARQ-Msg3Tx. A contention resolution timer is mac-ContentionResolutionTimer.

Only one random access process is allowed at a certain moment. If the UE is in one random access process while receiving a new random access request at the same time, whether to continue the current process or to cancel the current process depends on the implementation of the UE, and then one new process is initiated according to the new request.

A PRACH access mechanism of the LTE-Release-8/9/10 system adopts 64 base sequences (ID: 0 to 63), which includes three PRACH sequences, that is, the foregoing PRACH sequences of Group A, PRACH sequences of Group B, and non-contention based PRACH sequences, so as to solve the problem that PRACHs of all UEs access the eNB. However, because an LTE-Release 11 and later versions adopt multiple RRHs (Remote Radio Head) to enhance the DL and UL data capacity of the system, it is caused that the PRACH resource is insufficient. Especially in the four schemes of CoMP solutions, multiple RRHs and MeNBs (Macro eNB, macro eNodeB) adopt a same Cell ID (cell identity), thereby resulting in significant increase of the number of UEs in the radio cell, and the original 64 IDs become far insufficient for a large number of UEs to access multiple RRHs or MeNBs. In this way, the PRACH contention is caused to be so excessively fierce that many UEs fail to access the network, thereby affecting user experience of UEs.

SUMMARY

An embodiment of the present invention provides a method, a base station, and a user equipment for accessing an enhanced PRACH, which can reduce the fierceness of contention access to a PRACH.

On one aspect, a PRACH access method is provided, which includes: determining a PRACH sequence group used by multiple base stations, where the multiple base stations use a same cell identity and include a macro base station and at least one pico base station, and the PRACH sequence group includes k1 first PRACH sequences, k2 second PRACH sequences, k3 third PRACH sequences, k4 fourth PRACH sequences, k5 fifth PRACH sequences, and k6 sixth PRACH sequences, where k1 and k4 are positive integers, and k2, k3, k5, and k6 are nonnegative integers; and sending an indication parameter of the PRACH sequence group to a user equipment UE for the UE to randomly access a network, where the indication parameter is used for indicating the first PRACH sequences to the sixth PRACH sequences.

On another aspect, a PRACH access method is provided, which includes: receiving an indication parameter of a PRACH sequence group used by multiple base stations, where the multiple base stations use a same cell identity and include a macro base station and at least one pico base station, and the indication parameter is used for indicating first PRACH sequences to sixth PRACH sequences, where the first PRACH sequences to the sixth PRACH sequences are included in the PRACH sequence group; determining, according to the indication parameter, that the PRACH sequence group includes k1 first PRACH sequences, k2 second PRACH sequences, k3 third PRACH sequences, k4 fourth PRACH sequences, k5 fifth PRACH sequences, and k6 sixth PRACH sequences, where k1 and k4 are positive integers, and k2, k3, k5, and k6 are nonnegative integers; and selecting a PRACH sequence from the PRACH sequence group to randomly access a network.

On another aspect, a PRACH access method is provided, which includes: determining M PRACH sequence groups used by L groups of base stations, where the L groups of base stations use a same cell identity, each PRACH sequence group includes m1 first PRACH sequences, m2 second PRACH sequences, and m3 third PRACH sequences, M and L are positive integers and 1<M≤L, m1 is a positive integer, and m2 and m3 are nonnegative integers; and sending an indication parameter of the PRACH sequence group to a user equipment UE for the UE to randomly access a network, where the indication parameter is used for indicating the first PRACH sequences to the third PRACH sequences, where the first PRACH sequences to the third PRACH sequences are included in the M PRACH sequences.

On another aspect, a PRACH access method is provided, which includes: receiving an indication parameter of M PRACH sequence groups used by L groups of base stations, where the L groups of base stations use a same cell identity, and the indication parameter is used for indicating first PRACH sequences to third PRACH sequences, where the first PRACH sequences to the third PRACH sequences are included in each PRACH sequence group; determining, according to the indication parameter, that each PRACH sequence group includes m1 first PRACH sequences, m2 second PRACH sequences, and m3 third PRACH sequences, M and L are positive integers and 1<M≤L, m1 is a positive integer, and m2 and m3 are nonnegative integers; and selecting a PRACH sequence from the PRACH sequence group to randomly access a network.

On another aspect, a base station is provided, which includes: a determining unit, configured to determine a physical random access channel PRACH sequence group used by multiple base stations, where the multiple base stations use a same cell identity and include a macro base station and at least one pico base station, and the PRACH sequence group includes k1 first PRACH sequences, k2 second PRACH sequences, k3 third PRACH sequences, k4 fourth PRACH sequences, k5 fifth PRACH sequences, and k6 sixth PRACH sequences, where k1 and k4 are positive integers, and k2, k3, k5, and k6 are nonnegative integers; and a sending unit, configured to send an indication parameter of the PRACH sequence group determined by the determining unit, to a user equipment UE for the UE to randomly access a network, where the indication parameter is used for indicating the first PRACH sequences to the sixth PRACH sequences.

On another aspect, a user equipment is provided, which includes: a receiving unit, configured to receive an indication parameter of a physical random access channel PRACH sequence group used by multiple base stations, where the multiple base stations use a same cell identity and include a macro base station and at least one pico base station, and the indication parameter is used for indicating first PRACH sequences to sixth PRACH sequences, where the first PRACH sequences to the sixth PRACH sequences are included in the PRACH sequence group; a determining unit, configured to determine, according to the indication parameter received by the receiving unit, that the PRACH sequence group includes k1 first PRACH sequences, k2 second PRACH sequences, k3 third PRACH sequences, k4 fourth PRACH sequences, k5 fifth PRACH sequences, and k6 sixth PRACH sequences, where k1 and k4 are positive integers, and k2, k3, k5, and k6 are nonnegative integers; and a selecting unit, configured to select a PRACH sequence from the PRACH sequence group determined by the determining unit, to randomly access a network.

On another aspect, a base station is provided, which includes: a determining unit, configured to determine M physical random access channel PRACH sequence groups used by L groups of base stations, where the L groups of base stations use a same cell identity, each PRACH sequence group includes m1 first PRACH sequences, m2 second PRACH sequences, and m3 third PRACH sequences, M and L are positive integers and 1<M≤L, m1 is a positive integer, and m2 and m3 are nonnegative integers; and a sending unit, configured to send an indication parameter of the PRACH sequence group determined by the determining unit, to a user equipment UE for the UE to randomly access a network, where the indication parameter is used for indicating the first PRACH sequences to the third PRACH sequences, where the first PRACH sequences to the third PRACH sequences are included in the M PRACH sequences.

On another aspect, a user equipment is provided, which includes: a receiving unit, configured to receive an indication parameter of M physical random access channel PRACH sequence groups used by L groups of base stations, where the L groups of base stations use a same cell identity, the indication parameter is used for indicating first PRACH sequences to third PRACH sequences, where the first PRACH sequences to the third PRACH sequences are included in each PRACH sequence group; a determining unit, configured to determine, according to the indication parameter, that each PRACH sequence group includes m1 first PRACH sequences, m2 second PRACH sequences, and m3 third PRACH sequences, M and L are positive integers and 1<M≤L, m1 is a positive integer, and m2 and m3 are nonnegative integers; and a selecting unit, configured to select a PRACH sequence from the PRACH sequence group to randomly access a network.

In the embodiments of the present invention, the PRACH sequence group used by the multiple base stations includes the first PRACH sequences to the sixth PRACH sequences and is not limited to three PRACH sequences, thereby reducing the fierceness of contention access to a PRACH.

BRIEF DESCRIPTION OF THE DRAWINGS

FIG. 7 is a schematic diagram of a PRACH sequence group based on two root sequences according to Embodiment 1 of the present invention;

FIG. 8 is a schematic diagram of a PRACH sequence group based on one root sequence according to Embodiment 1 of the present invention;

FIG. 9 is a schematic diagram of a PRACH sequence group based on one root sequence according to Embodiment 1 of the present invention;

DETAILED DESCRIPTION OF THE EMBODIMENTS

The technical solutions in the embodiments of the present invention are clearly and completely described in the following with reference to the accompanying drawings in the embodiments of the present invention. Apparently, the described embodiments are some embodiments of the present invention rather than all of the embodiments. All other embodiments derived by persons of ordinary skill in the art based on the embodiments of the present invention without any creative effort shall fall within the protection scope of the present invention.

The technical solutions of the present invention is applicable to various communication networks such as the global system for mobile communication (GSM), code division multiple access (CDMA) system, wideband code division multiple access (WCDMA), general packet radio service (GPRS), and long term evolution (LTE).

A base station may be a base transceiver station (BTS) in the GSM or the CDMA, may also be a NodeB in the WCDMA, and may also be an evolutional Node B (eNB or e-NodeB) in the LTE, which is not limited in the present invention, but for ease of description, the NodeB is taken as an example for description in the following embodiments.

A user equipment (UE) may also be referred to as a mobile terminal, a mobile user equipment, and so on, which can communicate with one or more core networks via a radio access network (for example, RAN). The user equipment may be the mobile terminal, for example, a mobile phone (or referred to as a "cellular" phone) and a computer with the mobile terminal, for example, may be a portable, pocket, handheld, computer built-in or onboard mobile apparatus, and they exchange speech or data or exchange both speech and data at the same time with the radio access network.

Figure 1:
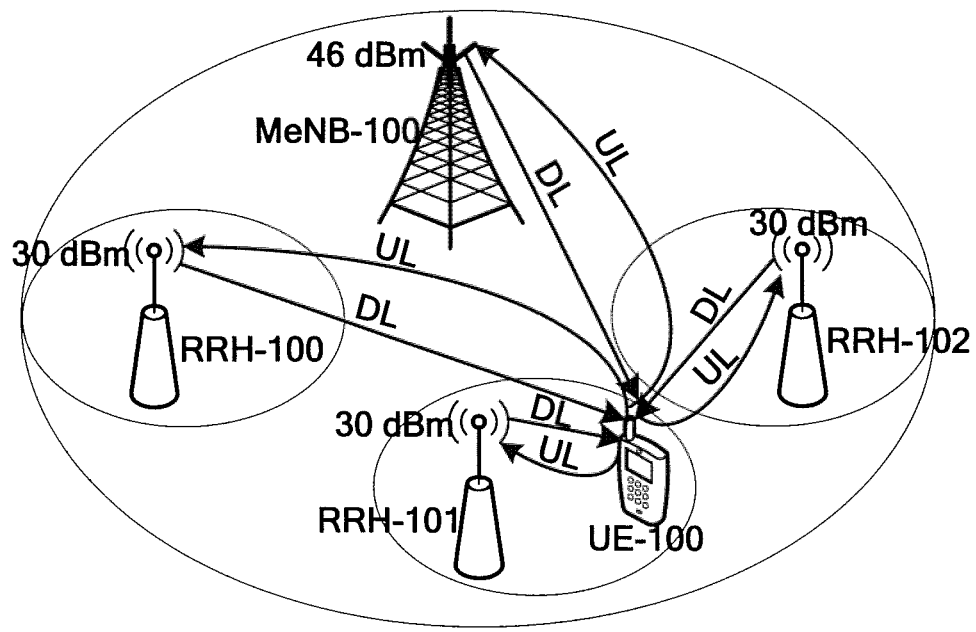
FIG. 1 is a schematic diagram of a scheme of combined communication of a macro base station and an RRH in a heterogeneous network where an embodiment of the present invention can be applied.

As shown in FIG. 1, it is a schematic diagram of a scheme of combined communication of a macro base station and an RRH in a heterogeneous network where an embodiment of the present invention is applicable. Power transfer nodes in a macro base station area where one same cell ID is shared include a macro base station MeNB-100 with sending power of 46 dBm and pico base stations RRH-100, RRH-101, and RRH-102 which are with sending power of 30 dBm.

As shown in FIG. 1, it is a schematic diagram of combined communication of a macro base station and an RRH in a heterogeneous network. In CoMP Solution 4 described in an LTE-Release-11, the macro base station MeNB-100 and the pico base stations RRH-100, RRH-101, and RRH-102 share one same cell identity (Cell ID). The MeNB-100, the RRH-100, the RRH-101, the RRH-102, and a UE-100 in the coverage together form a downlink (DL) CoMP transmission system and an uplink (UL) CoMP transmission system of CoMP Solution 4.

It should be noted that, in FIG. 1, although optical fibers between base stations are not drawn for simplicity, actually optical fibers exist among the MeNB and RRHs. The optical fiber can implement ideal data exchange, for example, with a short enough delay, a fast enough speed, and a large enough capacity.

In addition, the number of base stations in FIG. 1 is merely exemplary and does not limit the scope of the embodiments of the present invention. For example, in the embodiments of the present invention, the number of RRHs may be two, or may be more than three.

Figure 2:
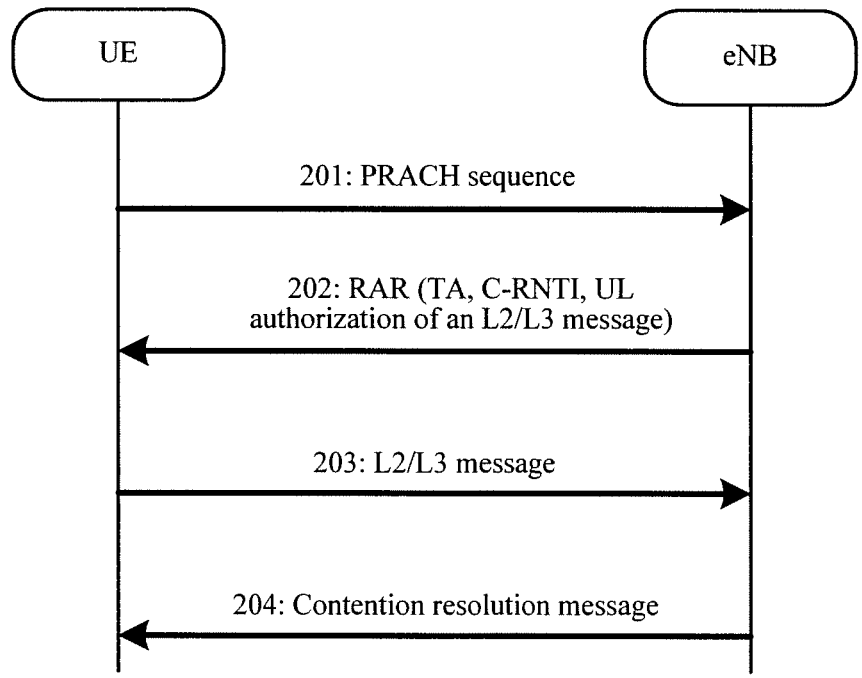
FIG. 2 is a schematic diagram of a PRACH solution of an LTE Release-8/9/10.

FIG. 2 is a schematic diagram of a conventional PRACH solution. In an LTE-Release-8/9/10 system, as shown in FIG. 2, by adopting a conventional PRACH process, there are a non-contention-based PRACH solution and a contention-based PRACH solution, where the contention-based PRACH solution includes four steps:

201: The UE randomly selects a PRACH Preamble, and sends the PRACH sequence to the eNB.

202: After receiving the PRACH sequence sent by the UE, the eNB sends a random access response (RAR) to the UE.

203: The UE send a layer 2 (L2) message or a layer 3 (L3) message or a message including both the L2 message and the L3 message to the eNB.

204: The eNB sends a contention resolution message to the UE according to the received L2/L3 message of the UE. According to the contention resolution message sent by the eNB, the UE confirms that the PRACH succeeds in contention, and selects the PRACH sequence to access the eNB.

In the existing standardized protocol TS 36.213, as shown in Table 1 (reference may be made to Table 5.7.2-4 of TS 36.213), Table 1 specifies correspondence between a logical root sequence and a physical root sequence, where the logical root sequence and the physical root sequence are of an FDD system. In the LTE Rel-8/9/10 system, the network configures a RACH sequence that allows the UE to adopt, each cell has 64 logical RACH root sequences, that is, Logical ROOT_SEQUENCE. The Logical ROOT_SEQUENCE is a part of system information (SI), the eNB informs the UE of SIB2 through a PDSCH channel, and the 64 Logical ROOT_SEQUENCEs are continuous. Sequence numbers of the logical RACH root sequences are continuous, which are from 0 to 837. For example, the UE knows from the SIB2 that a start number of the logical RACH root sequence is 60, which indicates that the logical RACH sequences of the UE are from 60 to 123, and corresponding physical RACH sequences are {178, 661, 136, 703, 86, 753, 78, 761, 43, 796, 39, 800, 20, 819, 21, 818, 95, 744, 202, 637, 190, 649, 181, 658, 137, 702, 125, 714, 151, 688, 217, 622, 128, 711, 142, 697, 122, 717, 203, 636, 118, 721, 110, 729, 89, 750, 103, 736, 61, 778, 55, 784, 15, 824, 14, 825, 12, 827, 23, 816, 34, 805, 37, 802}. The UE knows, through SIB2, that the logical RACH root sequence is performed before a PRACH process starts. In a non-contention based random access process, an RRC configures ra-PreambleIndex and ra-PRACH-MaskIndex in SIB2 to inform the UE of the logical RACH root sequence that should be used in the PRACH process, while in a contention-based random access process, the RRC configures in SIB2 a start logical root sequence of the PRACH sequence group and its sequence length information, where the sequence length information is an ending point identity of the root sequence or the number of sequences included in the root sequence. When starting the PRACH process, the UE first finds a physical RACH root sequence according to the logical RACH root sequence and mapping relationships in Table 1, then randomly selects a PRACH sequence in the physical RACH root sequence, and then sends the sequence to the eNB to perform access.

TABLE 1

Mapping relationship between a logical root sequence and a physical root sequence in an FDD system

| Logical Root Sequence Number | Physical Root Sequence Number " (According to an ascending order of corresponding logical sequence numbers) |
|---|---|
| 0-23 | 129, 710, 140, 699, 120, 719, 210, 629, 168, 671, 84, 755, 105, 734, 93, 746, 70, 769, 60, 779, 2, 837, 1, 838 |
| 24-29 | 56, 783, 112, 727, 148, 691 |
| 30-35 | 80, 759, 42, 797, 40, 799 |
| 36-41 | 35, 804, 73, 766, 146, 693 |
| 42-51 | 31, 808, 28, 811, 30, 809, 27, 812, 29, 810 |
| 52-63 | 24, 815, 48, 791, 68, 771, 74, 765, 178, 661, 136, 703 |
| 64-75 | 86, 753, 78, 761, 43, 796, 39, 800, 20, 819, 21, 818 |
| 76-89 | 95, 744, 202, 637, 190, 649, 181, 658, 137, 702, 125, 714, 151, 688 |
| 90-115 | 217, 622, 128, 711, 142, 697, 122, 717, 203, 636, 118, 721, 110, 729, 89, 750, 103, 736, 61, 778, 55, 784, 15, 824, 14, 825 |
| 116-135 | 12, 827, 23, 816, 34, 805, 37, 802, 46, 793, 207, 632, 179, 660, 145, 694, 130, 709, 223, 616 |
| 136-167 | 228, 611, 227, 612, 132, 707, 133, 706, 143, 696, 135, 704, 161, 678, 201, 638, 173, 666, 106, 733, 83, 756, 91, 748, 66, 773, 53, 786, 10, 829, 9, 830 |
| 168-203 | 7, 832, 8, 831, 16, 823, 47, 792, 64, 775, 57, 782, 104, 735, 101, 738, 108, 731, 208, 631, 184, 655, 197, 642, 191, 648, 121, 718, 141, 698, 149, 690, 216, 623, 218, 621 |
| 204-263 | 152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833 |
| 264-327 | 5, 834, 33, 806, 51, 788, 75, 764, 99, 740, 96, 743, 97, 742, 166, 673, 172, 667, 175, 664, 187, 652, 163, 676, 185, 654, 200, 639, 114, 725, 189, 650, 115, 724, 194, 645, 195, 644, 192, 647, 182, 657, 157, 682, 156, 683, 211, 628, 154, 685, 123, 716, 139, 700, 212, 627, 153, 686, 213, 626, 215, 624, 150, 689 |
| 328-383 | 225, 614, 224, 615, 221, 618, 220, 619, 127, 712, 147, 692, 124, 715, 193, 646, 205, 634, 206, 633, 116, 723, 160, 679, 186, 653, 167, 672, 79, 760, 85, 754, 77, 762, 92, 747, 58, 781, 62, 777, 69, 770, 54, 785, 36, 803, 32, 807, 25, 814, 18, 821, 11, 828, 4, 835 |
| 384-455 | 3, 836, 19, 820, 22, 817, 41, 798, 38, 801, 44, 795, 52, 787, 45, 794, 63, 776, 67, 772, 72, 767, 76, 763, 94, 745, 102, 737, 90, 749, 109, 730, 165, 674, 111, 728, 209, 630, 204, 635, 117, 722, 188, 651, 159, 680, 198, 641, 113, 726, 183, 656, 180, 659, 177, 662, 196, 643, 155, 684, 214, 625, 126, 713, 131, 708, 219, 620, 222, 617, 226, 613 |
| 456-513 | 230, 609, 232, 607, 262, 577, 252, 587, 418, 421, 416, 423, 413, 426, 411, 428, 376, 463, 395, 444, 283, 556, 285, 554, 379, 460, 390, 449, 363, 476, 384, 455, 388, 451, 386, 453, 361, 478, 387, 452, 360, 479, 310, 529, 354, 485, 328, 511, 315, 524, 337, 502, 349, 490, 335, 504, 324, 515 |
| 514-561 | 323, 516, 320, 519, 334, 505, 359, 480, 295, 544, 385, 454, 292, 547, 291, 548, 381, 458, 399, 440, 380, 459, 397, 442, 369, 470, 377, 462, 410, 429, 407, 432, 281, 558, 414, 425, 247, 592, 277, 562, 271, 568, 272, 567, 264, 575, 259, 580 |
| 562-629 | 237, 602, 239, 600, 244, 595, 243, 596, 275, 564, 278, 561, 250, 589, 246, 593, 417, 422, 248, 591, 394, 445, 393, 446, 370, 469, 365, 474, 300, 539, 299, 540, 364, 475, 362, 477, 298, 541, 312, 527, 313, 526, 314, 525, 353, 486, 352, 487, 343, 496, 327, 512, 350, 489, 326, 513, 319, 520, 332, 507, 333, 506, 348, 491, 347, 492, 322, 517 |
| 630-659 | 330, 509, 338, 501, 341, 498, 340, 499, 342, 497, 301, 538, 366, 473, 401, 438, 371, 468, 408, 431, 375, 464, 249, 590, 269, 570, 238, 601, 234, 605 |
| 660-707 | 257, 582, 273, 566, 255, 584, 254, 585, 245, 594, 251, 588, 412, 427, 372, 467, 282, 557, 403, 436, 396, 443, 392, 447, 391, 448, 382, 457, 389, 450, 294, 545, 297, 542, 311, 528, 344, 495, 345, 494, 318, 521, 331, 508, 325, 514, 321, 518 |
| 708-729 | 346, 493, 339, 500, 351, 488, 306, 533, 289, 550, 400, 439, 378, 461, 374, 465, 415, 424, 270, 569, 241, 598 |
| 730-751 | 231, 608, 260, 579, 268, 571, 276, 563, 409, 430, 398, 441, 290, 549, 304, 535, 308, 531, 358, 481, 316, 523 |
| 752-765 | 293, 546, 288, 551, 284, 555, 368, 471, 253, 586, 256, 583, 263, 576 |
| 766-777 | 242, 597, 274, 565, 402, 437, 383, 456, 357, 482, 329, 510 |
| 778-789 | 317, 522, 307, 532, 286, 553, 287, 552, 266, 573, 261, 578 |
| 790-795 | 236, 603, 303, 536, 356, 483 |
| 796-803 | 355, 484, 405, 434, 404, 435, 406, 433 |
| 804-809 | 235, 604, 267, 572, 302, 537 |
| 810-815 | 309, 530, 265, 574, 233, 606 |
| 816-819 | 367, 472, 296, 543 |
| 820-837 | 336, 503, 305, 534, 373, 466, 280, 559, 279, 560, 419, 420, 240, 599, 258, 581, 229, 610 |

Table 2 (reference may be made to Table 5.7.2-5 in the standardized protocol TS 36.213) specifies correspondence between a logical root sequence and a physical root sequence, where the logical root sequence and the physical root sequence are of a TDD system. A mapping relationship of the corresponding logical RACH and physical RACH and a principle for the eNB to inform SIB2 broadcast information in the PDSCH are the same as those in the FDD system, which is not repeatedly described here again.

TABLE 2

Mapping relationship between a logical root sequence and a physical root sequence in a TDD system

| Logical Root Sequence Number | Physical Root Sequence Number $u$ (According to an ascending order of corresponding logical sequence numbers) | | | | | | | | | | | | | | | | | | |
|---|---|---|---|---|---|---|---|---|---|---|---|---|---|---|---|---|---|---|---|
| 0-19 | 1 | 138 | 2 | 137 | 3 | 136 | 4 | 135 | 5 | 134 | 6 | 133 | 7 | 132 | 8 | 131 | 9 | 130 | 10 | 129 |
| 20-39 | 11 | 128 | 12 | 127 | 13 | 126 | 14 | 125 | 15 | 124 | 16 | 123 | 17 | 122 | 18 | 121 | 19 | 120 | 20 | 119 |
| 40-59 | 21 | 118 | 22 | 117 | 23 | 116 | 24 | 115 | 25 | 114 | 26 | 113 | 27 | 112 | 28 | 111 | 29 | 110 | 30 | 109 |
| 60-79 | 31 | 108 | 32 | 107 | 33 | 106 | 34 | 105 | 35 | 104 | 36 | 103 | 37 | 102 | 38 | 101 | 39 | 100 | 40 | 99 |
| 80-99 | 41 | 98 | 42 | 97 | 43 | 96 | 44 | 95 | 45 | 94 | 46 | 93 | 47 | 92 | 48 | 91 | 49 | 90 | 50 | 89 |
| 100-119 | 51 | 88 | 52 | 87 | 53 | 86 | 54 | 85 | 55 | 84 | 56 | 83 | 57 | 82 | 58 | 81 | 59 | 80 | 60 | 79 |
| 120-137 | 61 | 78 | 62 | 77 | 63 | 76 | 64 | 75 | 65 | 74 | 66 | 73 | 67 | 72 | 68 | 71 | 69 | 70 | — | — |

The specific steps of the contention-based PRACH solution are described in detail in the following.

201: Send a PRACH sequence.

Before sending an uplink PRACH sequence, the UE should already be synchronized with the downlink of the system. The downlink synchronization means the UE acquires frame synchronization and a system broadcast message, but the uplink is not synchronized. Through the PRACH sequence, the eNB knows one terminal exists and attempts to establish a connection with the base station.

A bandwidth of a reserved resource is six RBs (Resource Block), which can satisfy all bandwidths supported by the LTE. In this way, system extension can be implemented very conveniently, and the design of a physical layer is based on such consideration, for example, both a synchronous channel and a physical broadcast channel are like that. Considering that the uplink is not synchronized when the PRACH sequence is sent, interference in other non-access resources needs to be avoided, so that the PRACH sequence length is about 0.9 ms, and 0.1 ms is left as a protection time. The PRACH sequence is acquired through a specific shift based on Zadoff-Chu (ZC). The sequence has some very good characteristics, for example, has very good self-correlation and fixed amplitude. A specific method for designing and detecting the PRACH sequence is described in detail in the following with reference to the embodiments.

202: Random access response.

The eNB ensures uplink synchronization through timeslot adjustment, which is implemented by sending a TA. Meanwhile, an uplink resource is allocated. The foregoing content is carried in a random access response message.

When detecting the PRACH sequence, the eNB sends on a DL-SCH one response, which includes an index number of the sequence, time adjustment information, resource scheduling information (that is, the uplink resource allocated to the user), and a temporary RNTI, and is used for the UE to intercept a corresponding PDCCH channel in a subsequent interaction process.

All terminals that send the PRACH sequence use one ID (RA-RNTI) reserved for use by a random access response to intercept an L1/L2 control channel for decoding the DL-SCH, so as to acquire the information on it:

$$RA\text{-}RNTI = 1 + t\_id + 10 * f\_id$$

where t_id designates an index number of a first subframe of the PRACH (0<=t_id<10), f_id is a PRACH index in this subframe, that is, a frequency domain location index. However, for the FDD system, there is only one frequency domain location, and therefore, the f_id is always zero.

Interception time starts with three subframes after the preamble is sent and lasts ra-ResponseWindowSize subframes, and the window size is acquired by reading a system broadcast message (SIB2). This value can be set to 10 at maximum, because misunderstanding may occur if this value is greater than 10, and because there is an opportunity of random access in next radio frame, to avoid this situation, this window is set to 10 at maximum. For a specific setting manner of a window, reference may be made to TS36.331. If multiple terminals select one same PRACH sequence at the same time, all the terminals may acquire the information, then a conflict is caused, and the conflict is resolved in two subsequent steps 203 and 204. A process of receiving a response is as follows:

When the terminal receives an RA response successfully, the terminal adjusts an uplink sending time, saves a temporary C-RNTI acquired from the response for subsequent communication till a final C-RNTI is acquired, and in the end sends power information of the PRACH sequence. If the response is not received successfully, one is added to a counter PREAMBLE_TRANSMISSION_COUNTER.

a. If the counter is equal to PREAMBLE_TRANS_MAX+1, the maximum number of times of sending is reached:

a random access error is reported to an upper-layer.

b. If an RA preamble is selected by a MAC, one value is randomly selected from 0 to a backoff time, then the time of the selected value is delayed, and one RA process is restarted.

c. Otherwise, an RA resource, for example, power, preamble or corresponding PRACH, is reselected to initiate a new random access process.

203: Terminal identification.

A terminal UE sends, on the allocated resource, a user ID and corresponding UL-SCH information for sending basic information such as the user ID and an RRC connection request, that is, the so-called message 3 (MSG3), specific content is related to a status of the user. Through the foregoing two steps 201 and 202, the terminal acquires uplink synchronization and necessary information of subsequent communication. However, to implement the uplink data transmission, a unique C-RNTI must be acquired. According to different user statuses, the process has different message interactions. If the contention needs to be resolved, a contention resolution ID may be further sent to perform a contention resolution confirmation operation in step 204. Because multiple UEs may select a same preamble sequence, resources that the UEs acquire in step 202 are the same. In this case, when message 3 is sent, the same manner is selected at the same location for sending, which naturally results in a conflict and is equivalent to multiple UEs contending for access. Although there is a conflict, the eNB may still solves the MSG3 sent by a certain UE, so that through the contention resolution message in step 204, the UE may access successfully. For example, when one certain UE is relatively far from the base station and has a relatively weak signal, while another UE is close to the base station and has a relatively strong signal, the UE that is relatively far may only cause a not very large interference and the eNB can still solve the message 3 of the UE that is relatively close. In addition, message 3 further carries a contention resolution ID. The contention resolution ID is unique and is not reduplicative with that of another UE, which is optimally an identity such as an IMSI of the UE. Message 4 carries the contention resolution ID and sends it to the UE, so that the UE naturally knows the access succeeds.

204: Contention resolution.

The eNB sends a conflict resolution message to the terminal UE through the DL-SCH. Only step 201 is a pure physical layer process, and the three subsequent steps 202-204 have no difference with an ordinary data transmission process. In a random access process, the content of the message such as MSG3 or MSG4 of the MAC protocol is not fixed, which sometimes may carry an RRC connection request and sometimes may carry some control messages and even service data packets, and is therefore referred to as message 3 whose meaning is a third message. It is known that a conflict may occur on message 3, and after the message is sent, a contention resolution timer needs to be started right away (this timer needs to be restarted in every retransmission of message 3 subsequently). For an initial access, if the uplink message includes a CCCH SDU (for example, an RRC connection request message) in step 203, and a temporary C-RNTI sent by the downlink PDCCH is received: if a MAC PDU decodes successfully, the contention resolution timer is stopped; and if the MAC PDU includes a control message unit of the contention resolution ID of the UE and this ID matches the contention resolution ID sent by the uplink, it is considered that the contention resolution succeeds, and this MAC PDU is demultiplexed to extract the content in it, the temporary C-RNTI is set to the C-RNTI, and meanwhile, the temporary C-RNTI is discarded and then it is confirmed that the random access succeeds; otherwise, the temporary C-RNTI is discarded, and the UE considers that the random access fails and discards this MAC PDU; if the contention resolution timer times out, it is considered that the access fails; and after the failure, a random access process is restarted according to a retreat mechanism until the number of attempts exceeds a threshold value, and then an access failure is reported to the upper-layer.

It should be noted that message 4 does not have a retransmission mechanism. If retransmission is adopted for message 4, because in this case the contention is not resolved, if some UEs succeed in decoding and some UEs fail in decoding; or some UEs succeed in receiving and some UEs fail in receiving, a simultaneous ACK/NACK situation occurs. Although a similar situation also occurs on message 3, because the eNB confirms the information and returns only one kind of confirmation information once, subsequent processing is not affected.

The existing PRACH access mechanism in the LTE-Release-8/9/10 system adopts 64 base sequences (ID: 0 to 63), which can solve a problem that PRACHs of all UEs access the eNB. However, because an LTE-Release11 and later versions adopt multiple RRHs to enhance the DL and UL data capacity of the system and a large number of UEs covered by the RRHs are introduced, insufficient PRACH resources (PRACH time and frequency resource, Preamble) are caused. Especially in the CoMP Solution 4 scheme, multiple RRHs and MeNBs adopt a same cell identity, which causes a significant increase to the number of UEs in the radio cell, and the original 64 IDs cannot satisfy a requirement that a large number of UEs access multiple RRHs and/or MeNBs. In this way, the PRACH contention is caused to be so excessively fierce that many UEs cannot access the network, which affects user experience of the UEs.

Therefore, the technical problems to be solved in the present invention is mainly that a PRACH ID resource in CoMP Solution 4 is insufficient to be provided for a large number of UEs to use, and the PRACH contention is excessively fierce. The method proposed in the present invention can increase the PRACH ID capacity and reduce the fierceness of the PRACH contention.

Figure 3:
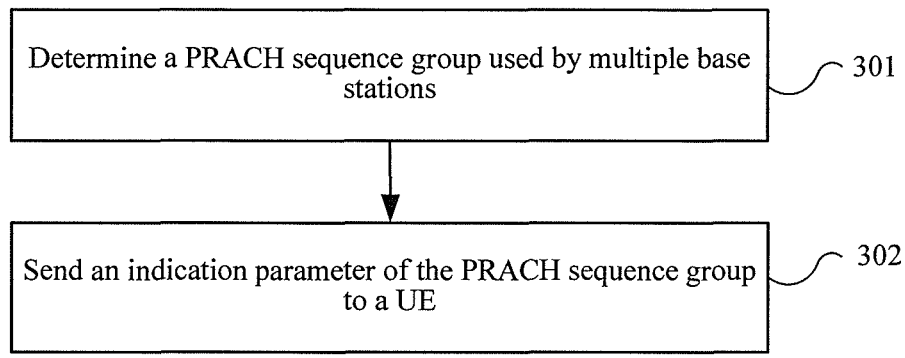
FIG. 3 is a flow chart of a method for accessing an enhanced PRACH according to an embodiment of the present invention.

FIG. 3 is a flow chart of a method for accessing an enhanced PRACH according to an embodiment of the present invention. The method in FIG. 3 is performed by base stations (for example, MeNB-100 and RRH-100, RRH-101, and RRH-102 which are shown in FIG. 1) and is performed before the method in FIG. 2.

301: Determine a PRACH sequence group used by multiple base stations. The multiple base stations use a same cell identity and include a macro base station and at least one pico base station. The PRACH sequence group includes k1 first PRACH sequences, k2 second PRACH sequences, k3 third PRACH sequences, k4 fourth PRACH sequences, k5 fifth PRACH sequences, and k6 sixth PRACH sequences, where k1 and k4 are positive integers, and k2, k3, k5, and k6 are nonnegative integers.

The total number k1+k2+k3+k4+k5+k6 of PRACH sequences included in the PRACH sequence group may be a fixed value, for example, 128. However, a specific value of the total number of PRACH sequences is not limited in the embodiment of the present invention.

Optionally, in one embodiment, the first PRACH sequences and the fourth PRACH sequences are PRACH sequences of contention-based Group A, the second PRACH sequences and the fifth PRACH sequences are PRACH sequences of contention-based Group B, and the third PRACH sequences and the sixth PRACH sequences are non-contention based PRACH sequences. Examples of the first PRACH sequences to the sixth PRACH sequences are further described in detail in the following in combination with specific embodiments (for example, embodiments in FIG. 7 to FIG. 9).

Optionally, in another embodiment, the first PRACH sequences to the third PRACH sequences are used for the random access to the macro base station or the pico base station, the fourth PRACH sequences to the sixth PRACH sequences are used for the random access to the pico base station. In this way, the first PRACH sequences to the sixth PRACH sequences can be divided into two groups, which correspond to the macro base station or the pico base station, respectively, so as to facilitate flexible selection by the UE and reduce the fierceness of the contention.

302: Send an indication parameter of the PRACH sequence group to the UE for the UE to randomly access a network. The indication parameter is used for indicating the first PRACH sequences to the sixth PRACH sequences.

A manner of sending the indication parameter of the PRACH sequence group is not limited in the embodiments of the present invention. For example, the indication parameter can be carried in one or more messages. A form of the message does not limit the scope of the embodiments of the present invention, and may be, for example, a broadcast message or a dedicated message. These manners all fall within the scope of the embodiments of the present invention.

Optionally, in one embodiment, the PRACH sequence group may be based on two root sequences. For example, the first PRACH sequences to the third PRACH sequences are based on a first root sequence, and the fourth PRACH sequences to the sixth PRACH sequences are based on a second root sequence. In this case, the indication parameter may include a starting point identity of the first root sequence, length information of the first root sequence, a starting point identity of the second root sequence, and length information of the second root sequence. The length information of the first root sequence is an ending point identity of the first root sequence or the number of sequences included in the first root sequence. The length information of the second root sequence is an ending point identity of the second root sequence or the number of sequences included in the second root sequence. In the embodiments of the present invention, the length information of the root sequence is optional. If the base station and the UE use the same length information (for example, negotiated in advance, agreed in advance or specified according to a protocol), the indication parameter may not include length information.

Optionally, in another embodiment, the PRACH sequence group may be based on one root sequence. For example, the first PRACH sequences to the sixth PRACH sequences are based on one root sequence. In this case, the indication parameter may include a starting point identity of the root sequence and length information of the root sequence. The length information of the root sequence is an ending point identity of the root sequence or the number of sequences included in the root sequence. In the embodiments of the present invention, the length information of the root sequence is optional. If the base station and the UE use the same length information (for example, negotiated in advance, agreed in advance or specified according to a protocol), the indication parameter may not include length information.

Optionally, in another embodiment, the size of each sequence can be flexibly set. For example, k1+k2+k3=N, k4+k5+k6=K−N, K and N are positive integers, and K>N. K is the total number of PRACH sequences included in the PRACH sequence group, which is described as in the foregoing, and may be a fixed value, for example, 128. However, the value of K is not limited in the present invention. The indication parameter further includes k1, kx, k4, and ky, which satisfies kx=k1+k2 and ky=k4+k5. The base station may carry the indication parameter in SIB2 which is sent to the UE. In this case, k1, kx, k4, and ky can be carried through SIB2. For example, k1 is the number of sequences of Group A, sizeOfRA-PreamblesGroupA, defined in SIB2 of the macro base station; kx is the number of contention-based sequences of the macro base station, numberOfRA-Preambles; k4 is the number of sequences of Group A, sizeOfRA-PreamblesGroupA, defined in SIB2 of the pico base station; and ky is the number of contention-based sequences of the pico base station, numberOfRA-Preambles.

In addition, if the PRACH sequence group is based on two root sequences and the indication parameter includes the length information of the root sequence, the base station may not separately inform the UE of the value of N, the UE can acquire the value of N through the length information of the first root sequence or the second root sequence. In addition, if N is a fixed value, the base station and the UE may negotiate or agree upon the value of N in advance, so that N does not need to be carried in the indication parameter. On another aspect, if the PRACH sequence group is based on one root sequence, the value of N can be carried by including N in the indication parameter sent through SIB2, for example, by adding one information element in SIB2 or by using a reserved field in SIB2.

For example, it is assumed that both K and N are fixed values, the base station does not need to inform the UE of the values of K and N. For example, N=64, and K=128, and in this case k1+k2+k3=64, and k4+k5+k6=64. The indication parameter further includes k1, kx, k4, and ky. kx=k1+k2, ky=k4+k5. The base station can carry the indication parameter in the SIB2 which is sent to the UE, and in this case, k1, kx, k4, and ky can be carried through SIB2. For example, k1 is the number of sequences of Group A, sizeOfRA-PreamblesGroupA, defined in SIB2 of the macro base station; kx is the number of contention-based sequences of the macro base station, numberOfRA-Preambles; k4 is the number of sequences of Group A, sizeOfRA-PreamblesGroupA, defined in SIB2 of the pico base station; and ky is the number of contention-based sequences of the pico base station, numberOfRA-Preambles.

In the embodiments of the present invention, the PRACH sequence group used by multiple base stations includes first PRACH sequences to sixth PRACH sequences and is not limited to three PRACH sequences, thereby reducing the fierceness of contention access to a PRACH.

In the embodiment in FIG. 3, the total number K of PRACH sequences in the PRACH sequence group can always be a fixed value, for example, 128, and is not related to the number of macro base stations and pico base stations. For example, when the number of the pico base stations is two or more than two, all base stations that participate in the CoMP still use the total number of 128 PRACH sequences.

Figure 4:
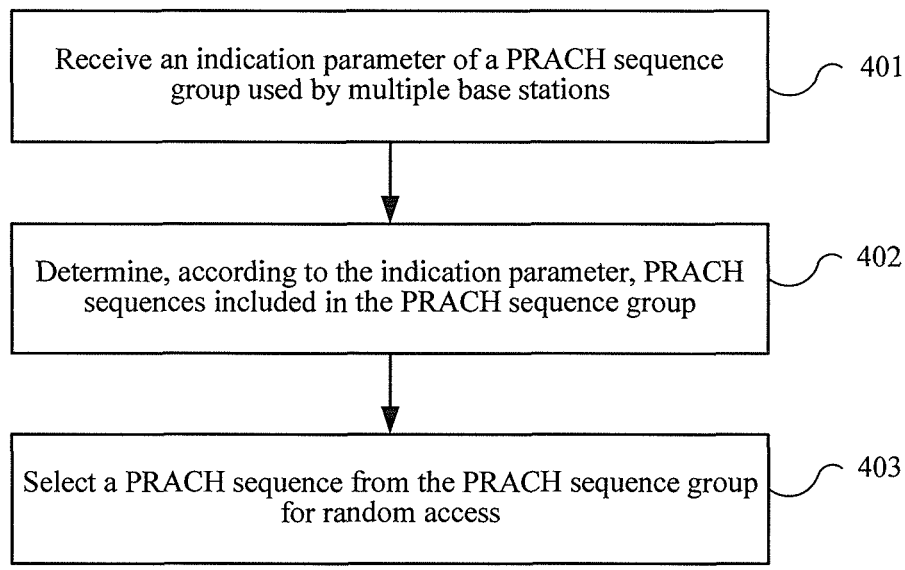
FIG. 4 is a flow chart of a method for accessing an enhanced PRACH according to another embodiment of the present invention.

FIG. 4 is a flow chart of a method for accessing an enhanced PRACH according to another embodiment of the present invention. The method in FIG. 4 is performed by the UE (for example, UE-100 shown in FIG. 1), and corresponds to the method in FIG. 3.

401: Receive an indication parameter of a PRACH sequence group used by multiple base stations. The multiple base stations use a same cell identity and include a macro base station and at least one pico base station. The indication parameter is used for indicating first PRACH sequences to sixth PRACH sequences, where the first PRACH sequences to the sixth PRACH sequences are included in the PRACH sequence group.

For example, the indication parameter received in step 401 may be the indication parameter sent in step 302 in FIG. 3. In the embodiment of the present invention, the manner of receiving an indication parameter of the PRACH sequence group is not limited. For example, the indication parameter carried in one or more messages can be received. The form of the message does not limit the scope of the embodiments of the present invention, and may be, for example, a broadcast message or a dedicated message. All these manners fall within the scope of the embodiments of the present invention.

402: Determine, according to the indication parameter, that the PRACH sequence group includes k1 first PRACH sequences, k2 second PRACH sequences, k3 third PRACH sequences, k4 fourth PRACH sequences, k5 fifth PRACH sequences, and k6 sixth PRACH sequences, where k1 and k4 are positive integers, and k2, k3, k5, and k6 are non-negative integers.

The total number k1+k2+k3+k4+k5+k6 of PRACH sequences included in the PRACH sequence group may be a fixed value, for example, 128. However, the specific value of the total number of the PRACH sequences is not limited in the embodiments of the present invention.

Optionally, in one embodiment, according to a starting point identity of the first root sequence, length information of the first root sequence, a starting point identity of the second root sequence, and length information of the second root sequence which are included in the indication parameter, it can be determined that the first PRACH sequences to the third PRACH sequences are based on the first root sequence, and the fourth PRACH sequences to the sixth PRACH sequences are based on the second root sequence. In other words, the PRACH sequence group is based on two root sequences. The length information of the first root sequence is the ending point identity of the first root sequence or the number of sequences included in the first root sequence. The length information of the second root sequence is the ending point identity of the second root sequence or the number of sequences included in the second root sequence. In the embodiments of the present invention, the length information of the root sequence is optional. If the base station and the UE use the same length information (for example, negotiated in advance, agreed in advance or specified according to the protocol), the indication parameter may not include length information.

Optionally, in another embodiment, according to the starting point identity of one root sequence and the length information of the root sequence which are included in the indication parameter, it can be determined that the first PRACH sequences to the sixth PRACH sequences are based on the root sequence. In other words, the PRACH sequence group is based on one root sequence. The length information of the root sequence is the ending point identity of the root sequence or the number of sequences included in the root sequence. In the embodiments of the present invention, the length information of the root sequence is optional. If the base station and the UE use the same length information (for example, negotiated in advance, agreed in advance or specified according to the protocol), the indication parameter may not include length information.

Optionally, in another embodiment, k1 to k6 can be determined according to indication information which is of the values of k1, kx, k4, and ky and is included in the indication parameter. For example, kx=k1+k2, ky=k4+k5, k1+k2+k3=N, k4+k5+k6=K−N, K and N are positive integers, and K>N. K is the total number of PRACH sequences included in the PRACH sequence group, which is described as in the foregoing, and may be a fixed value, for example, 128. However, the value of K is not limited in the present invention. The base station can carry the indication parameter in the SIB2 which is sent to the UE, and in this case, k1, kx, k4, and ky can be carried through SIB2. For example, k1 is the number of sequences of Group A, sizeOfRA-PreamblesGroupA, defined in SIB2 of the macro base station; kx is the number of contention-based sequences of the macro base station, numberOfRA-Preambles; k4 is the number of sequences of Group A, sizeOfRA-PreamblesGroupA, defined in SIB2 of the pico base station; and ky is the number of contention-based sequences of the pico base station, numberOfRA-Preambles.

In addition, if the PRACH sequence group is based on two root sequences and the indication parameter includes the length information of the root sequence, the base station may not separately inform the UE of the value of N, and the UE may acquire the value of N through length information of the first root sequence or the second root sequence. In addition, if N is a fixed value, the base station and the UE may negotiate or agree upon the value of N in advance, so that N does not need to be carried in the indication parameter. On another aspect, if the PRACH sequence group is based on one root sequence, the value of N is carried by including N in the indication parameter sent through SIB2, for example, by adding one information element in SIB2 or by using a reserved field in SIB2, and the UE determines k1 to k6 according to the value of N.

For example, it is assumed that both K and N are fixed values, the base station does not need to inform the UE of the values of K and N. For example, N=64, K=128, and in this case, k1 +k2+k3=64, and k4 +k5 +k6=64. The indication parameter further includes k1 , kx, k4, and ky. kx= k1 +k2, ky=k4+k5 . The base station can carry the indication parameter in the SIB2 which is sent to the UE, and in this case, k1 , kx, k4, and ky can be carried through SIB2. For example, k1 is the number of sequences of Group A, sizeOfRA-PreamblesGroupA, defined in SIB2 of the macro base station; kx is the number of contention-based sequences of the macro base station, numberOfRA-Preambles; k4 is the number of sequences of Group A, sizeOfRA-PreamblesGroupA, defined in SIB2 of the pico base station; and ky is the number of contention-based sequences of the pico base station, numberOfRA-Preambles.

403: Select a PRACH sequence from the PRACH sequence group to randomly access a network.

Optionally, in one embodiment, a PRACH sequence can be selected from the first PRACH sequence or the fourth PRACH sequence for random access of contention-based Group A. Or, a PRACH sequence can be selected from the second PRACH sequences or the fifth PRACH sequences for random access of contention-based Group B. Or, a PRACH sequence can be selected from the third PRACH sequences or the sixth PRACH sequences for non-contention based random access. Examples of the first PRACH sequence to the sixth PRACH sequence are further described in detail in the following in combination with specific embodiments (for example, embodiments in FIG. 7 to FIG. 9).

Optionally, in another embodiment, a PRACH sequence can be selected from the first PRACH sequences to the third PRACH sequences for random access to the macro base station or the pico base station. Alternatively, a PRACH sequence can be selected from the fourth PRACH sequences to the sixth PRACH sequences for random access to the pico base station. In this way, the first PRACH sequences to the sixth PRACH sequences can be divided into two groups, which correspond to the macro base station or the pico base station, respectively, so as to facilitate flexible selection by the UE and reduce the fierceness of the contention.

A process of specifically performing random access may be similar to the method shown in FIG. 2, and the process of performing random access in the embodiments of the present invention is further described in the following in combination with specific examples (the embodiment shown in FIG. 6), which is not repeatedly described here again.

In the embodiments of the present invention, a PRACH sequence group used by multiple base stations includes first PRACH sequences to sixth PRACH sequences and is not limited to three PRACH sequences, thereby reducing the fierceness of contention access to a PRACH.

In the embodiment in FIG. 4, the total number K of PRACH sequences in the PRACH sequence group can always be a fixed value, for example, 128, and is not related to the number of the macro base stations and the pico base stations. For example, when the number of the pico base stations is two or more than two, all base stations that participate in the CoMP still use the total number of 128 PRACH sequences.

Embodiments of the present invention are described in further detail in the following with reference to specific examples. It should be noted that these examples are merely to help persons skilled in the art to better understand the embodiments of the present invention, not intended to limit the scope of the embodiment of the present invention.

Embodiment 1

Figure 5:
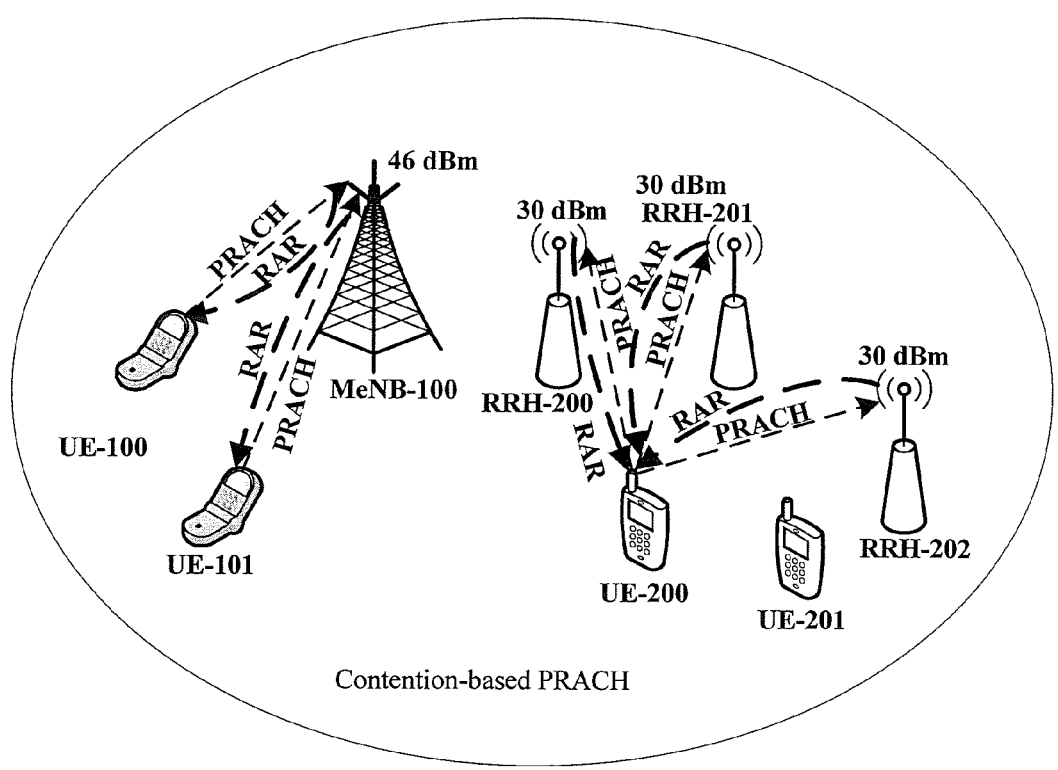
FIG. 5 is a schematic diagram of a scheme of a CoMP communication system where an embodiment of the present invention can be applied.

FIG. 5 is a schematic diagram of a scheme of a CoMP communication system where Embodiment 1 of the present invention is applicable. In this embodiment, as shown in FIG. 5, there are a MeNB-100 and low power transmit nodes (LPN), for example RRH-200, RRH-201, and RRH-202 in a radio cell. These RRHs can be actually regarded as pico base stations (Pico). UE-100 and UE-101 are legacy UEs of an LTE Rel-8/9/10, UE200 and UE-201 are UEs of an LTE Rel-11/12, MeNB-100 and RRH-200, RRH-201, and RRH-202 are connected to a server for background communication through optical fibers. It should be noted that, in FIG. 5, although the optical fibers are not drawn for simplicity, actually the optical fibers between the MeNB/RRHs all exist. The optical fiber can implement ideal data exchange, for example, with a short delay, a fast speed, and a large capacity.

Figure 6:
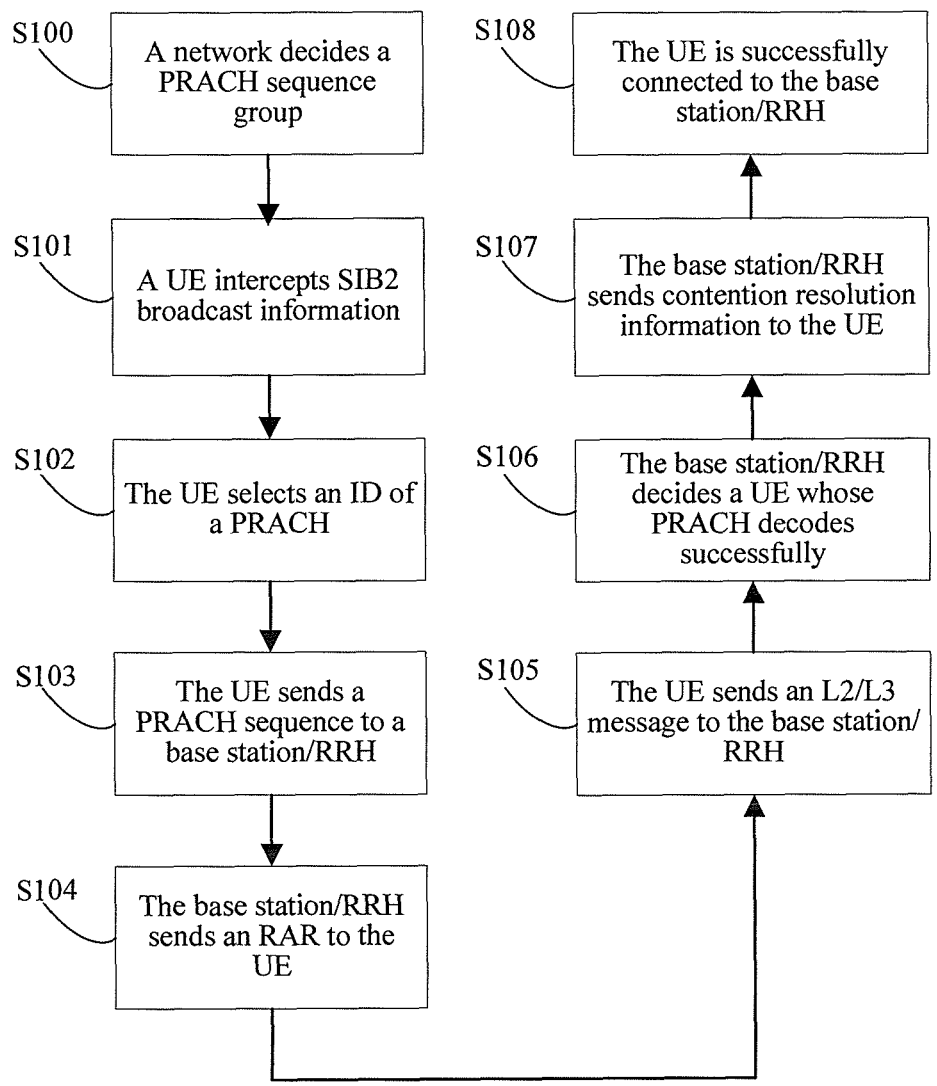
FIG. 6 is a flow chart of a separate MeNB/RRH PRACH method according to Embodiment 1 of the present invention.

Specific implementation of a separate MeNB/RRH PRACH method proposed in this embodiment is shown in FIG. 6, and the specific steps of FIG. 6 are described in the following in combination with the schematic diagram of the scheme in FIG. 5.

S100: A network decides a PRACH sequence group.

In the LTE Rel-8/9/10, the network (formed by eNBs) decides the PRACH sequence group. In CoMP Solution 4, because one or more RRHs are adopted and these RRHs all use the same cell ID as the MeNB, a same-ID RRH system is formed. The characteristics of the RRH system are a large number of RRHs and a large number of UEs, so that the fierceness of a PRACH sequence ID contention increases greatly. In this way, that the network decides the PRACH sequence group is decided by the MeNB and the multiple RRHs together. In this embodiment, as shown in FIG. 7, a PRACH sequence group based on two root sequences is proposed. A root sequence Preamble 1 is used for a PRACH of a Macro user, and a root sequence Preamble 2 is used for a PRACH of a Pico user. The Macro user here is defined as a Legacy UE (including a UE of the LTE Rel-8/9/10), and the Pico user is defined as a UE covered by one or more RRHs (including a UE of the LTE Release-11). If some UEs are not only covered by the MeNB, but also covered by the RRH, these UEs can make a selection in the root sequences Preamble 1 and Preamble 2. In this way, in an RRH system, because the PRACH sequence group is introduced, the fierceness of the PRACH contention of all UEs is significantly reduced. Referring to Table 1, for example, the MeNB adopts logical PRACH sequences {216, 623, 218, 621, 200, 201, . . . , 263}, and corresponding physical PRACH sequences are {152, 687, 144, 695, 134, 705, 138, 701, 199, 640, 162, 677, 176, 663, 119, 720, 158, 681, 164, 675, 174, 665, 171, 668, 170, 669, 87, 752, 169, 670, 88, 751, 107, 732, 81, 758, 82, 757, 100, 739, 98, 741, 71, 768, 59, 780, 65, 774, 50, 789, 49, 790, 26, 813, 17, 822, 13, 826, 6, 833}. The Pico adopts logical PRACH sequences {90, 91, . . . , 153}, and corresponding physical PRACH sequences are {217, 622, 128, 711, 142, 697, 122, 717, 203, 636, 118, 721, 110, 729, 89, 750, 103, 736, 61, 778, 55, 784, 15, 824, 14, 825, 12, 827, 23, 816, 34, 805, 37, 802, 46, 793, 207, 632, 179, 660, 145, 694, 130, 709, 223, 616, 228, 611, 227, 612, 132, 707, 133, 706, 143, 696, 135, 704, 161, 678, 201, 638, 173, 666}.

In this embodiment, as shown in FIG. 8, a PRACH sequence group which is based on one root sequence may also be adopted. A Macro user (for example, a Legacy UE) selects a PRACH sequence from Group A_Macro, Group B_Macro, and non-contention based PRACH sequence_Macro, a Pico user selects a PRACH sequence from Group A_Pico, Group B_Pico, and non-contention based PRACH sequence_pico, and IDs of the 128 logical PRACH sequences are continuous.

In this embodiment, as shown in FIG. 9, the Preamble based on one root sequence is also completely compatible with the LTE Rel-8/9/10 system, where the total length of Group A_Macro, Group B_Macro, and non-contention based PRACH sequence_Macro is 64.

S101: The UE intercepts SIB2 broadcast information.

As shown in FIG. 5, UEs in a non-connected status in the radio cell include Legacy UEs (for example, UE-100 and UE-101) of the LTE Rel-8/9/10 and UEs (for example, UE-200, UE-201, UE-202, and UE-203) of the LTE Rel-11/12/13. UE-100, UE-101, UE-200, UE-201, UE-202, and UE-203 intercept SIB2 broadcast information on a PDSCH channel, and the SIB2 broadcast information is sent by MeNB-100, RRH-200, RRH-201, and RRH-202. Upper-layer SIB2 information gives RACH_ROOT_SEQUENCE, and according to RACH_ROOT_SEQUENCE and a mapping relationship in the foregoing Table 1, the UE acquires u in a root ZC sequence, that is, a physical number. The physical root sequence is acquired according to the u value, and a cyclic shift sequence is calculated according to the information of SIB2, such as a PRACH Configuration Index, zeroCorrelationZoneConfig, and High-speed-flag. Because one cell generates 64 cyclic shift sequences, but the number of sequences that may be generated after the shift of one root ZC sequence is smaller than 64, a subsequently adjacent u of this u value is selected according to a given logical number and physical number to continue generating a root sequence for cyclic shift until 64 preamble locations are generated. For example, it is illustrated in a standardized decision TS36.321 that a PDCCH order or an RRC message indicates ra-PreambleIndex and ra-PRACH-MaskIndex, where ra-PreambleIndex informs the UE of PRACH sequences that it can use, and ra-PRACH-MaskIndex informs the UE of PRACH time and frequency resources that it can use. Before a PRACH process starts, prach-ConfigIndex indicates the resources which are used for sending a PRACH. A PRACH preamble is divided into three parts: the PRACH sequences of contention-based random access being divided into Group A and Group B, and a PRACH sequence group of non-contention based random access. The PRACH sequences including Group A and Group B are calculated and obtained through a parameter numberOfRA-Preambles and a parameter sizeOfRA-PreamblesGroupA which are provided by SIB2. The parameter provided by SIB2 also includes a starting point identity of a Group A root sequence and length information of the Group A root sequence, where the length information is an ending point identity of the Group A root sequence or the number of sequences included in the Group A root sequence.

If sizeOfRA-PreamblesGroupA and numberOfRA-Preambles have an equal size, the UE knows that sizeOfRA-PreamblesGroupB does not exist in SIB2. The PRACH sequence of Group A is from 0 to sizeOfRA-PreamblesGroupA−1, and the PRACH sequence of Group B is from sizeOfRA-PreamblesGroupA to numberOfRA-Preambles−1. Group A, Group B, and the non-contention based PRACH sequences are all subsets of the 64 PRACH sequences.

MeNB-100, RRH-200, RRH-201, and RRH-202 send an RS (Reference Signal), respectively, and UE-100, UE-101, UE-200, UE-201, UE-202, and UE-203 determine, according to the degree of the path-loss (PL) of each RS, the macro base station and/or one or more RRHs that they serve.

For example, UE-100 and UE-101, as Legacy UEs, can only recognize PRACH sequences of MeNB-100, so that a serving base station of UE-100 and UE-101 is MeNB-100, and accordingly, UE-100 and UE-101 acquire ID={0, 1, . . . , 63} of PRACH base sequences of MeNB-100. For another example, the strongest RS path-loss received by UE-200 comes from RRH-200, RRH-201, and RRH-202, respectively. Therefore, serving base stations of UE-200 are RRH-200, RRH-201, and RRH-202, and for the PRACH base sequences of UE-200, ID={64, 65, . . . , 127}; similarly, the serving base stations of UE-201 are RRH-200, RRH-201, and RRH-202, and then for the PRACH base sequences of UE-200, ID={64, 65, . . . , 127}. For another example, UE-202 intercepts that the strongest RS path-loss comes from MeNB-100 and RRH-200, so that the serving base stations of UE-202 are MeNB-100 and RRH-200, and UE-202 is not only a Macro user but also a Pico user, and therefore, for the PRACH base sequences of UE-202, ID={0, 1, . . . , 63} and ID={64, 65, . . . , 127}.

S102: The UE selects an ID of the PRACH sequence.

In S100, each UE already knows their serving base stations, so each UE knows the IDs of their PRACH base sequences. In the present invention, the PRACH IDs include two groups, that is, ID={0, 1, . . . , 63} and ID={64, 65, . . . , 127}. The corresponding UEs have three types, that is, the Legacy UE of the LTE Rel-8/9/10, a UE of the LTE Rel-11/12/13 that only selects ID={64, 65, . . . , 127}, and a UE of the LTE Rel-11/12/13 that selects ID={0, 1, . . . , 63} and ID={64, 65, . . . , 127} at the same time. The foregoing three types of UEs randomly select one ID of the PRACH sequences in their ID groups, respectively.

S103: The UE sends a PRACH sequence to the base station/RRH.

As shown in FIG. 5, UE-100 and UE-101 send PRACH sequences randomly selected according to step S101 to MeNB-100, and UE-200 sends PRACH sequences randomly selected according to step 2 to RRH-200, RRH-201, and RRH-202, respectively.

S104: The base station/RRH sends an RAR to the UE.

As shown in FIG. 5, MeNB-100 receives PRACH sequences sent by UE-100 and UE-101, and then MeNB-100 sends random access response (RAR) information to UE-100 and UE-101, respectively. RRH-200, RRH-201, RRH-202 receive PRACH sequences sent by UE-200, and then RRH-200, RRH-201, and RRH-202 jointly send RAR information to UE-200. Here, MeNB-100, RRH-200, RRH-201, and RRH-202 can also jointly send RAR information. For example, these base stations can adopt a combined sending manner of an SFN (Single Frequency Network) to enhance the reliability of downlink reception.

S105: The UE sends an L2/L3 message to the base station/RRH.

As shown in FIG. 5, after UE-200 receives RAR information sent by RRH-200, RRH-201, and RRH-202, and acquires combined RAR information, it is considered that distances from UE-200 to RRH-200, RRH-201, and RRH-202 are in an ascending order, and therefore, UE-200 sends the L2/L3 message according to a minimum TA (Timing Arrival). In this way, it can be basically guaranteed that RRH-200, RRH-201, and RRH-202 can jointly receive the L2/L3 message sent by UE-200.

S106: The base station/RRH decides a UE that decodes successfully.

Figure 10:
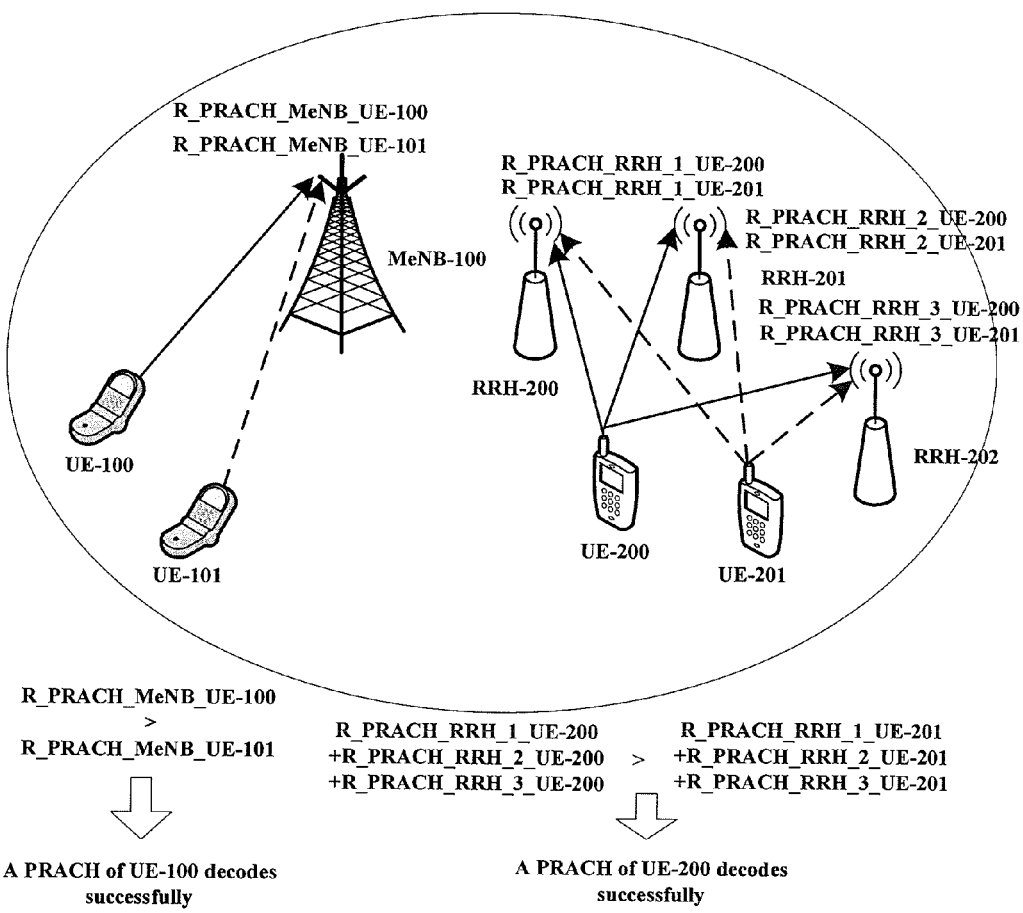
FIG. 10 is a schematic diagram of a PRACH contention according to Embodiment 1 of the present invention.

As shown in FIG. 5, after successfully receiving the L2/L3 message sent by UE-200, according to the received power, RRH-200, RRH-201, and RRH-202 decide UEs that decode successfully. For example, as shown in FIG. 10, in the LTE Rel-8/9/10 system, if both UE-100 and UE-101 select one random ID in ID={0, 1, . . . , 63}, for example, ID=10, as described in the foregoing, in this case, a contention needs to be resolved, and then, UE-100 and UE-101 may send a contention resolution ID so as to perform a contention resolution confirmation operation at the eNB. Because UE-100 and UE-101 select a same preamble sequence ID=10, the same uplink resource is acquired by UE-100 and UE-101, and when message 3 is sent, a same manner is selected at a same location for sending, and then a conflict naturally occurs. This is equivalent to both UE-100 and UE-101 needing to contend for access. In this case, UE-100 and UE-101 perform sending by using a same resource, thereby causing the conflict. However, the eNB may still solve MSG3 sent by a certain UE, and then through a contention resolution message, a certain UE can succeed in the access. Then, because MeNB-100 detects that the power of message 3 (MSG3) of UE-100 is greater than the power of message 3 (MSG3) of UE-101, MeNB-100 determines that message 3 (MSG3) which is of the PRACH sequence with ID=10 and is sent by UE-100 is decoded successfully. In a scheme of multiple RRHs, as shown in FIG. 10, if both UE-200 and UE-201 select one random ID, for example, ID=100, in ID={64, 65, . . . , 127}, RRH-200, RRH-201, and RRH-202 all receive messages 3 (MSG3) of the PRACHs of UE-200 and UE-201, and if the power of message 3 (MSG3) which is of the PRACH from UE-200 and is received by RRH-200, RRH-201, and RRH-202 is greater than the power of message 3 (MSG3) of the PRACH from UE-201, RRH-200, RRH-201, and RRH-202 determine that message 3 (MSG3) of the PRACH of UE-200 is decoded successfully.

S107: The base station/RRH sends contention resolution information to the UE.

As shown in FIG. 5, MeNB-100 sends a conflict resolution message to terminals UE-100 and UE-101 through a DL-SCH. In step S106, a conflict may occur on messages 3 of UE-100 and messages 3 of UE-101, and after the conflict resolution message is sent, a contention resolution timer needs to be started right away (and this timer needs to be restarted in every retransmission of message 3 subsequently). For initial access, if an uplink message includes CCCH SDU (for example, an RRC connection request message) in a third step and a temporary C-RNTI sent by a downlink PDCCH is received: if a MAC PDU decodes successfully, the contention resolution timer is stopped; if the MAC PDU includes a control message unit of the contention resolution ID of the UE and this ID matches the contention resolution ID sent by the uplink, it is considered that the contention resolution succeeds, and this MAC PDU is demultiplexed to extract the content in it, the temporary C-RNTI is set to the C-RNTI, and meanwhile, the temporary C-RNTI is discarded and then it is confirmed that the random access succeeds; otherwise, the temporary C-RNTI is discarded, the UE determines that the random access fails and discards this MAC PDU; if the contention resolution timer times out, it is considered that the access fails; and after the failure, a random access process is restarted according to a retreat mechanism until the number of attempts exceeds a threshold value, and then an access failure is reported to an upper-layer. Similarly, RNTIs of RRH-200, RRH-201, RRH-202 can be RA-200-RNTI, RA-201-RNTI, and RA-202-RNTI, respectively, and can also share a unified RA-RNTI.

S108: The UE is successfully connected to the base station/RRH.

As shown in FIG. 5, UE-100 and UE-101 are Legacy UEs, and after the information of PRACH contention resolution informed by MeNB-100 is received, UE-100 confirms that the random access succeeds, and then UE-100 accesses a radio network represented by MeNB-100. In this case, both UE-100 and UE-101 are UEs in a connected status (Connected). After UE-200 receives information of PRACH contention resolution informed by RRH-200, RRH-201, and RRH-202, respectively, UE-200 confirms that the random access succeeds, and UE-200 accesses a radio network jointly formed by RRH-200, RRH-201, and RRH-202. In this case, UE-200 is a UE in a connected status. Because this embodiment is for a scheme of CoMP Solution 4, and all macro base stations and LPNs share one same cell ID, MeNB-100, RRH-200, RRH-201, and RRH-202 which are shown in FIG. 5 share one same cell ID and the radio cells they represent are one same radio cell. The UE turns from a non-connected status into a connected status, which indicates that the whole PRACH process ends smoothly.

In this way, the macro base station and the pico base station use respective PRACH sequences, which increases the PRACH resource capacity, and reduces the fierceness of the contention of the PRACH sequences. The flexible scheduling of PRACH sequences of the macro base station and the pico base station can be implemented through an unfixed N (the embodiment in FIG. 8 or FIG. 9), which further enhances the setting flexibility of PRACH sequences.

Embodiment 2

Figure 11:
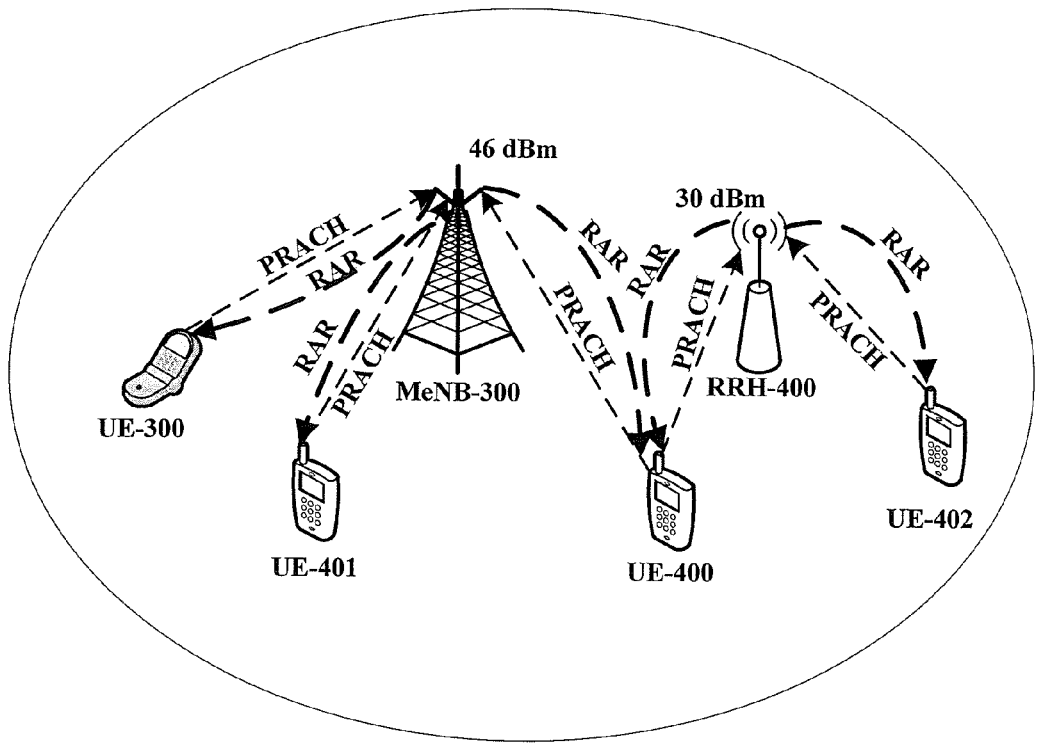
FIG. 11 is a schematic diagram of a scheme which is of a CoMP communication system and is applied in Embodiment 2 of the present invention.

In this embodiment, as shown in FIG. 11, a radio cell has a macro base station MeNB-300 and a low power transmit node RRH-400. RRH-400 can be actually regarded as a Pico base station, UE-300 is a Legacy UE of an LTE Rel-8/9/10, and UE-400, UE-401, and UE-402 are UEs of an LTE Rel-11/12. MeNB-300 and RRH-400 are connected to a server through optical fibers for background communication. It should be noted that in FIG. 11, although the optical fibers are not drawn for simplicity, in practice the optical fibers between the MeNB/RRHs all exist. The optical fibers can implement ideal data exchange, for example, with a short enough delay, a fast enough speed, and a large enough capacity.

PRACH sequence groups used by the base stations MeNB-300 and RRH-400 in Embodiment 2 are based on one root sequence, for example, as shown in FIG. 8. UE-300, as a Legacy UE, selects a PRACH ID in an ID={0, 1, . . . , 63} group. A PRACH mechanism of UE-400 and UE-402 is relatively flexible, and UE-400 can select ID={0, 1, . . . , 127} as a PRACH ID group, UE-401 can select a PRACH ID in an ID={0, 1, . . . , N−1} group, and UE-402 can select a PRACH ID in ID={N, N+1, . . . , 127}. Similar to Embodiment 1 of the present invention, specific implementation steps of Embodiment 2 can also support the foregoing UE-300, UE-400, UE-401, and UE-402 and a flexible ID grouping mechanism to implement, for example, a method in FIG. 6, which is not repeatedly described here again.

In this way, the macro base station and the pico base station use respective PRACH sequences, which increases the PRACH resource capacity, and reduces the fierceness of the contention of the PRACH sequences. The flexible scheduling of PRACH sequences of macro base stations and pico base stations can be implemented through an unfixed N (the embodiment in FIG. 8 or FIG. 9), so as to further enhance the setting flexibility of the PRACH sequence.

In the foregoing embodiments, the base stations are divided into two groups: the macro base stations as a group and the pico base stations RRHs as another group. The total number of the PRACH sequences used by the two groups of base stations may be a fixed value. The embodiments of the present invention is not limited to this, and the base stations can also be divided in another foam, for example, can be divided into three groups or more groups, and the types of base stations included in each group of base stations are not limited. In this way, each group of base stations can be allocated a corresponding PRACH sequence group, so as to further increase the capacity of the uplink PRACH and reduce the fierceness that multiple RRHs participate in the PRACH contention.

Figure 12:
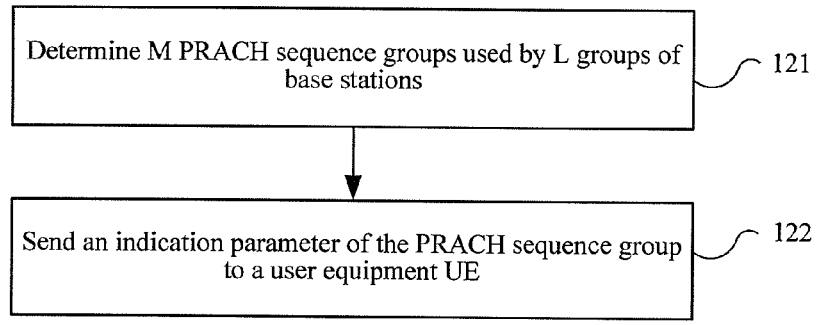
FIG. 12 is a flow chart of a method for accessing an enhanced PRACH according to another embodiment of the present invention.

FIG. 12 is a flow chart of a method for accessing an enhanced PRACH according to another embodiment of the present invention. The method in FIG. 12 is performed by a network side (for example, a base station).

121: Determine M PRACH sequence groups used by L groups of base stations, where the L groups of base stations use a same cell identity, each PRACH sequence group includes m1 first PRACH sequences, m2 second PRACH sequences, and m3 third PRACH sequences, M and L are positive integers and 1<M≤L, m1 is a positive integer, and m2 and m3 are nonnegative integers.

Optionally, m1 first PRACH sequences may be PRACH sequences of contention-based Group A, m2 second PRACH sequences may be PRACH sequences of contention-based Group B, and m3 third PRACH sequences may be non-contention based PRACH sequences.

Here, m1, m2, and m3 may be fixed values. Alternatively, m1, m2, and m3 may be variables, which are different for different sequence groups. This is not limited in the embodiments of the present invention.

A manner of grouping base stations is not limited in the embodiments of the present invention. For example, the base stations can be divided according to geographic locations. Optionally, in another embodiment, M PRACH sequence groups may be multiplexed in the L groups of base stations according to the geographic locations of the L groups of base stations. The base stations whose geographic locations are relatively far away have relatively small mutual interferences, and may be able to multiplex a same PRACH sequence group. In this way, the total number of the PRACH sequence groups can be reduced.

Optionally, in another embodiment, the groups of base stations that belong to a high contention area and are in the L groups of base stations can be allocated PRACH sequence groups that include more PRACH sequences. Alternatively, the groups of base stations that belong to a low contention area and are in the L groups of base stations can be allocated PRACH sequence groups that include fewer PRACH sequences. In this way, the fierceness of the contention of the PRACH sequences can be controlled better.

122: Send an indication parameter of the PRACH sequence group to a user equipment UE for the UE to randomly access a network. The indication parameter is used for indicating first PRACH sequences to third PRACH sequences, where the first PRACH sequences to the third PRACH sequences are included in M PRACH sequences.

A manner of sending an indication parameter of the PRACH sequence group is not limited in the embodiments of the present invention. For example, the indication parameter may be carried in one or more messages. A form of the message does not limit the scope of the embodiments of the present invention, and may be, for example, a broadcast message or a dedicated message. All these manners fall within the scope of the embodiments of the present invention.

Optionally, in one embodiment, it can be determined that M PRACH sequence groups are based on one root sequence, for example, similar to an example in FIG. 8 or FIG. 9. In this case, the indication parameter includes a starting point identity of the root sequence and length information of the root sequence. Alternatively, it can be determined that M PRACH sequence groups are based on M root sequences, for example, similar to an example shown in FIG. 7 (in FIG. 7, M=2). In this case, the indication parameter includes starting point identities of M root sequences and length information of M root sequences. The length information of the root sequence is an ending point identity of the root sequence or the number of sequences included in the root sequence. In the embodiments of the present invention, the length information of the root sequence is optional. If the base station and the UE use the same length information (for example, negotiated in advance, agreed in advance or specified according to a protocol), the indication parameter may not include length information.

Optionally, in another embodiment, the indication parameter may further include m1 and mx, where mx=m1+m2. The indication parameter may be carried through SIB2. For example, m1 is the number of Preambles of Group A, sizeOfRA-PreamblesGroupA, defined in SIB2; and mx is the number of contention-based Preambles, numberOfRA-Preambles.

m1+m2+m3 of the M PRACH sequence groups may be a fixed value, for example, equal to 64. Alternatively, the values of the number of sequences of each PRACH sequence group, m1+m2+m3, may be the same or different. The base station may separately send a corresponding value of m1+m2+m3 to the UE, for example, through a broadcast or dedicated message to indicate the number of sequences of each PRACH sequence group. A specific implementation manner may be similar to the example in FIG. 8 or FIG. 9.

Optionally, in another embodiment, the indication parameter can be further used to indicate identity information of a base station corresponding to each PRACH sequence group. In this way, during the access to a certain base station, it is convenient for the UE to select the PRACH sequence corresponding to the base station.

In the embodiment of the present invention, the base stations are divided, and corresponding PRACH sequence groups are determined for the base stations after the division, thereby expanding the PRACH sequence resource and reducing the fierceness of the contention of the PRACH sequences.

Figure 13:
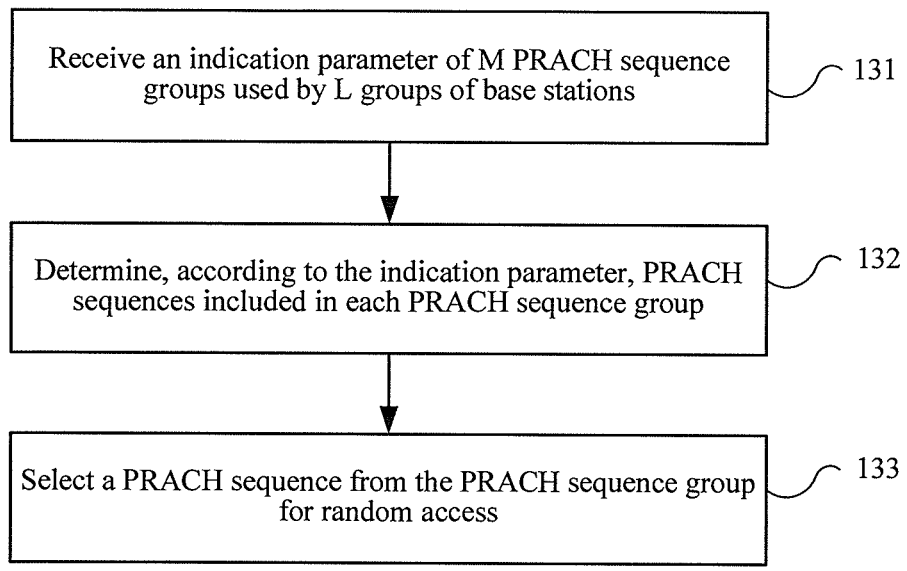
FIG. 13 is a flow chart of a method for accessing an enhanced PRACH according to another embodiment of the present invention.

FIG. 13 is a flow chart of a method for accessing an enhanced PRACH according to another embodiment of the present invention. The method in FIG. 13 is performed by the UE and corresponds to a method in FIG. 12.

131: Receive an indication parameter of M PRACH sequence groups used by L groups of base stations, where the L groups of base stations use a same cell identity, and the indication parameter is used for indicating first PRACH sequences to third PRACH sequences, where the first PRACH sequences to the third PRACH sequences are included in each PRACH sequence group.

For example, the indication parameter received in step 131 may be the indication parameter sent in step 122 in FIG. 12. The manner of receiving the indication parameter of the PRACH sequence group is not limited in the embodiments of the present invention. For example, the indication parameter carried in one or more messages can be received. The foam of the message does not limit the scope of the embodiments of the present invention, and may be, for example, a broadcast message or a dedicated message. All these manners fall within the scope of the embodiments of the present invention.

132: Determine, according to the indication parameter, that each PRACH sequence group includes m1 first PRACH sequences, m2 second PRACH sequences, and m3 third PRACH sequences, where M and L are positive integers and 1<M≤L, m1 is a positive integer, and m2 and m3 are nonnegative integers.

Optionally, m1 first PRACH sequences may be PRACH sequences of contention-based Group A, m2 second PRACH sequences may be PRACH sequences of contention-based Group B, and m3 third PRACH sequences may be non-contention based PRACH sequences.

Optionally, in one embodiment, according to a starting point identity of one root sequence and length information of the root sequence which are included in the indication parameter, it can be determined that M PRACH sequence groups are based on the root sequence. Alternatively, according to starting point identities of M root sequences and length information of the M root sequences, it can be determined that each PRACH sequence group among the M PRACH sequence groups is based on one root sequence among the M root sequences, where the starting point identities of the M root sequences and the length information of the M root sequences are included in the indication parameter. The length information of the root sequence is an ending point identity of the root sequence or the number of sequences included in the root sequence. In the embodiments of the present invention, the length information of the root sequence is optional. If the base station and the UE use the same length information (for example, negotiated in advance, agreed in advance or specified according to the protocol), the indication parameter may not include length information.

Optionally, in another embodiment, m1, m2, and m3 can further be determined according to m1 and mx which are included in the indication parameter, where mx=m1+m2. The indication parameter can be carried by SIB2, where m1 is the number of sequences of Group A, sizeOfRA-PreamblesGroupA, defined in a system information block SIB2; and mx is the number of contention-based sequences, numberOfRA-Preambles.

m1+m2+m3 of the M PRACH sequence groups may be a fixed value, for example, equal to 64. Alternatively, the values of the number of sequences of each PRACH sequence group, m1+m2+m3, can be the same or different, and the base station can separately send a corresponding value of m1+m2+m3 to the UE, for example, through a broadcast or dedicated message, so as to indicate the number of sequences of each PRACH sequence group. The specific implementation manner may be similar to the example in FIG. 8 or FIG. 9.

133: Select a PRACH sequence from the PRACH sequence group to randomly access a network.

A process of specifically performing random access may be similar to a corresponding process shown in FIG. 2 or FIG. 6, which is not repeatedly described here again.

In the embodiment of the present invention, the base stations are divided, and corresponding PRACH sequence groups are determined for the base stations after the division, thereby expanding the PRACH sequence resource and reducing the fierceness of the contention of the PRACH sequences.

Embodiments of the present invention are described in further detail in the following in combination with specific examples. It should be noted that these examples are merely to help persons skilled in the art to better understand the embodiments of the present invention, and not intended to limit the scope of the embodiment of the present invention.

Embodiment 3

Figure 14:
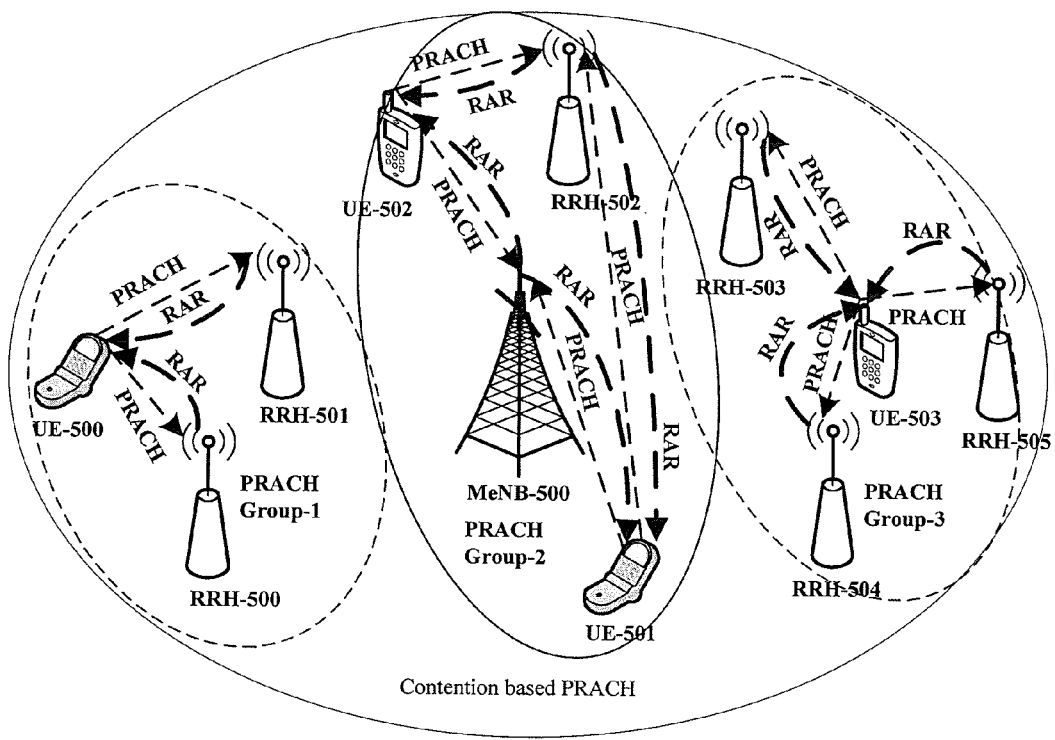
FIG. 14 is a schematic diagram of a group PRACH method according to Embodiment 3 of the present invention.

In this embodiment, as shown in FIG. 14, a radio cell has a macro base station MeNB-500 and low power transmit nodes RRH-500, RRH-501, RRH-502, RRH-503, RRH-504, and RRH-505, where these RRHs can be actually regarded as Pico base stations. UE-500, UE-501, UE-502, and UE-503 are UEs of an LTE Rel-11/12, and MeNB-500 and RRH-500, RRH-501, RRH-502, RRH-503, RRH-504, and RRH-505 are connected to a server through optical fibers for background communication. The base stations are divided based on geographic locations, as shown by dotted blocks in FIG. 14.

Similar to a manner of selecting a PRACH sequence in Embodiment 1, UE-500 can select ID={0, 1, . . . , 63} as a PRACH ID group, UE-501 and UE-502 can also select PRACH IDs in an ID={64, 65, . . . , 127} group, and UE-503 can select a PRACH ID in ID={128, 1, . . . , 191}. Similar to Embodiment 1 of the present invention, specific implementation steps of Embodiment 3 are not repeatedly described here again.

In the embodiment of the present invention, the base stations are divided, and corresponding PRACH sequence groups are determined for the base stations after the division, thereby expanding the PRACH sequence resource and reducing the fierceness of the contention of the PRACH sequences.

Embodiment 4

Figure 15:
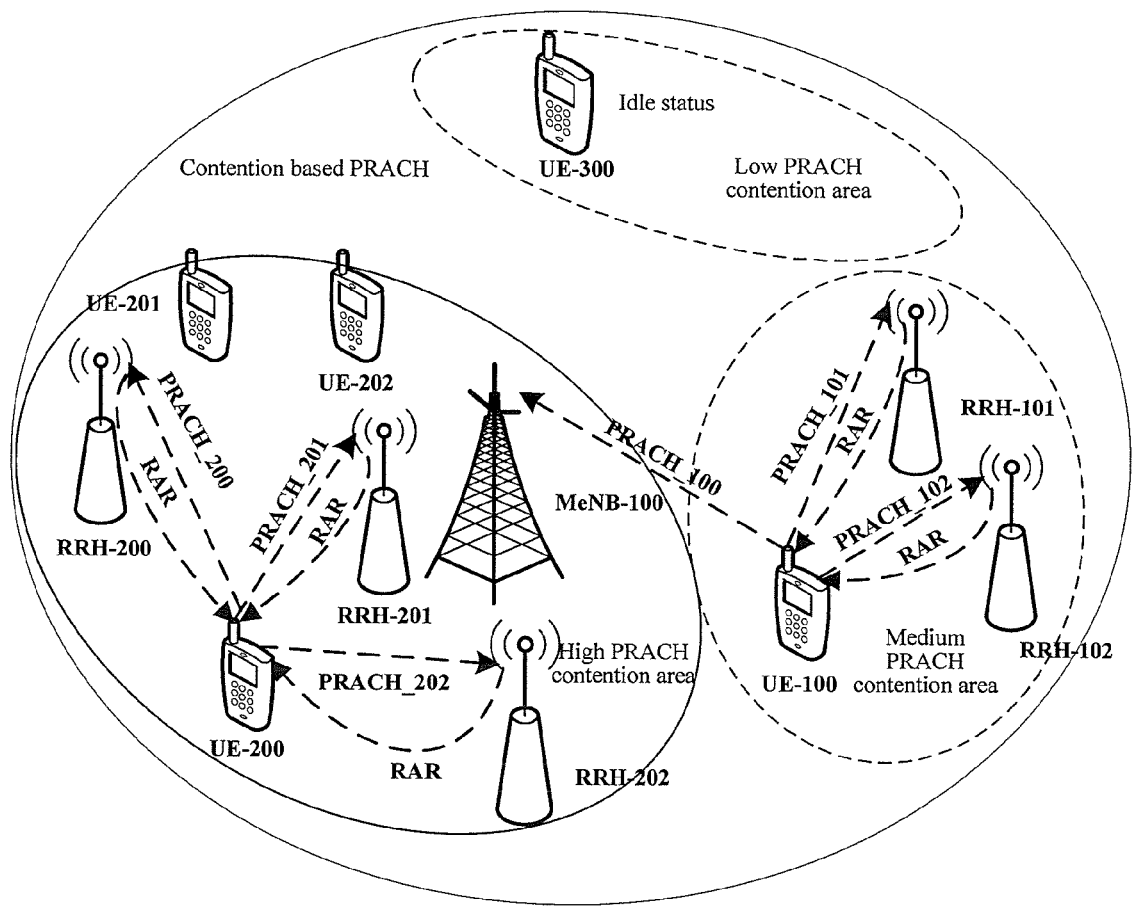
FIG. 15 is a schematic diagram of a load-balancing-based PRACH method according to Embodiment 4 of the present invention.

In this embodiment, as shown in FIG. 15, there are a macro base station MeNB-100 and low power transmit nodes RRH-200, RRH-201, and RRH-202 in a radio cell, and in the area where RRH-200, RRH-201, and RRH-202 are located, the number of RRHs is relatively large and the number of UEs is relatively large. In this way, the PRACH contention in this area is relatively fierce, and in this embodiment, the area is defined as a high PRACH contention area. The number of RRHs in the area where RRH-101 and RRH-102 are located is medium and the number of UEs is medium, the fierceness of the PRACH contention by multiple UEs in the area is medium, and the area is defined as a medium PRACH contention area. As shown in FIG. 15, if in a certain area, the number of RRHs is very small or the number of UEs is very small, the area is defined as a low PRACH contention area. A network divides the entire radio cell into the high PRACH contention area, the medium PRACH contention area, and the low PRACH contention area according to statistic information. Moreover, these networks can allocate different PRACH ID groups to these different PRACH areas, for example, allocate ID={0, 1, . . . , 191} to the high PRACH contention area, allocate ID={192, 193, . . . , 319} to the medium PRACH contention area, and allocate ID={320, 321, . . . , 383} to the low PRACH contention area. When a certain UE in a non-connected status enters a high PRACH contention area, the network informs the UE of adopting an ID of a medium or low PRACH contention area to contend for accessing the network. In this way, the fierceness of PRACH contention is controlled. Therefore, this method is a PRACH method based on PRACH load balancing, thereby reducing the fierceness of the PRACH contention of the radio cell. Similar to Embodiment 1 of the present invention, specific implementation steps of Embodiment 3 are not repeatedly described here again.

In the embodiment of the present invention, the base stations are divided, and corresponding PRACH sequence groups are determined for the base stations after the division, thereby expanding the PRACH sequence resource and reducing the fierceness of the contention of the PRACH sequences.

The base station and the user equipment according to the embodiments of the present invention are described in the following in combination with specific embodiments. For simplicity, the content which repeats that in the foregoing embodiments is not described in detail again.

Embodiment 5

Figure 16:
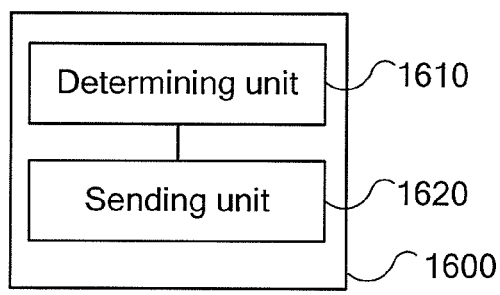
FIG. 16 is a schematic functional diagram of a base station according to Embodiment 5 of the present invention.

FIG. 16 is a block diagram of a base station according to an embodiment of the present invention. A base station 1600 in FIG. 16 includes a determining unit 1610 and a sending unit 1620.

The determining unit 1610 determines a PRACH sequence group used by multiple base stations. The multiple base stations use a same cell identity and include a macro base station and at least one pico base station, and the PRACH sequence group includes k1 first PRACH sequences, k2 second PRACH sequences, k3 third PRACH sequences, k4 fourth PRACH sequences, k5 fifth PRACH sequences, and k6 sixth PRACH sequences, where k1 and k4 are positive integers, and k2, k3, k5, and k6 are nonnegative integers.

The sending unit 1620 sends to a UE an indication parameter of the PRACH sequence group determined by the determining unit 1610 for the UE to randomly access a network, where the indication parameter is used for indicating the first PRACH sequences to the sixth PRACH sequences.

In the embodiments of the present invention, the PRACH sequence group used by multiple base stations includes the first PRACH sequences to the sixth PRACH sequences and is not limited to three PRACH sequences, thereby reducing the fierceness of contention access to a PRACH.

The determining unit 1610 can be implemented by a processor, and the sending unit 1620 can be implemented by a transmitter or a transceiver. The base station 1600 in FIG.

16 can implement each step of a method shown in FIG. 3, which is not described in detail again so as to avoid repetition.

Optionally, in one embodiment, the first PRACH sequences or the fourth PRACH sequences determined by the determining unit 1610 are PRACH sequences of contention-based Group A, the second PRACH sequences or the fifth PRACH sequences are PRACH sequences of contention-based Group B, and the third PRACH sequences or the sixth PRACH sequences are non-contention based PRACH sequences.

Optionally, in another embodiment, the first PRACH sequences to the third PRACH sequences, determined by the determining unit 1610, are based on a first root sequence, the fourth PRACH sequences to the sixth PRACH sequences are based on a second root sequence, and the indication parameter sent by the sending unit 1620 includes a starting point identity of the first root sequence, length information of the first root sequence, a starting point identity of the second root sequence, and length information of the second root sequence, where the length information of the first root sequence is an ending point identity of the first root sequence or the number of sequences included in the first root sequence; and the length information of the second root sequence is an ending point identity of the second root sequence or the number of sequences included in the second root sequence.

Optionally, in another embodiment, the first PRACH sequence to the sixth PRACH sequences, determined by the determining unit 1610, are based on one root sequence, and the indication parameter includes a starting point identity of the root sequence and length information of the root sequence, where the length information of the root sequence is an ending point identity of the root sequence or the number of sequences included in the root sequence.

Optionally, in another embodiment, k1 +k2+k3=64, k4+k5 +k6=64. The indication parameter sent by the sending unit 1620 further includes k1 , kx, k4, and ky, where kx= k1 +k2, ky=k4+k5 , where k1 is the number of sequences of Group A, sizeOfRA-PreamblesGroupA, defined in a system information block SIB2 of the macro base station; kx is the number of contention-based sequences of the macro base station, numberOfRA-Preambles; k4 is the number of sequences of Group A, sizeOfRA-PreamblesGroupA, defined in SIB2 of the pico base station; and ky is the number of contention-based sequences of the pico base station, numberOfRA-Preambles.

Optionally, in another embodiment, k1 +k2+k3=N, k4+ k5 +k6=K−N, K and N are positive integers, and K>N. The indication parameter sent by the sending unit 1620 further includes indication information of the values of k1 , kx, k4, and ky, where kx=k1 +k2, ky=k4 +k5 , where k1 is the number of sequences of Group A, sizeOfRA-PreamblesGroupA, defined in SIB2 of the macro base station; kx is the number of contention-based sequences of the macro base station, numberOfRA-Preambles; k4 is the number of sequences of Group A, sizeOfRA-PreamblesGroupA, defined in SIB2 of the pico base station; and ky is the number of contention-based sequences of the pico base station, numberOfRA-Preambles.

Optionally, in another embodiment, the first PRACH sequences to the third PRACH sequences, determined by the determining unit 1610, are used for random access to the macro base station or the pico base station, and the fourth PRACH sequences to the sixth PRACH sequences are used for random access to the pico base station.

Optionally, in another embodiment, the base station 1600 can further implement other operations related to the base station in FIG. 5 to FIG. 11 (Embodiment 1 and Embodiment 2). For example, the base station 1600 may send SIB2 broadcast information to the user equipment, and the SIB2 broadcast information includes a starting ID of a logical ID group of the PRACH sequences, the number of sequences of Group A and Group B numberOfRA-Preamble, and the number of sequences of Group A sizeOfRA-Preambles-GroupA. The base station 1600 can further receive a PRACH sequence sent by the user equipment.

The base station 1600 can further send a random access response (RAR) to the user equipment. After detecting the PRACH sequence sent by the user equipment, the base station 1600 sends on a downlink shared channel (DL-SCH) the foregoing RAR, which includes: an index number of the PRACH sequence, time adjustment information, uplink resource scheduling information (UL grant), and a temporary RNTI, which is used for the user equipment to intercept a corresponding PDCCH channel in a subsequent exchange process.

The base station 1600 can further receive L2/L3 information sent by the UE, that is, receive a user ID sent by the UE on the allocated resource on the uplink, which is the L2 information, and information such as the corresponding uplink shared channel (UL-SCH) information for use of an RRC connection request, which is the L3 information (MSG3). To implement the uplink data transmission, the UE must acquire a unique C-RNTI, and according to different user statuses, this process has different message interactions. If the PRACH contention needs to be resolved, the UE may send a contention resolution ID so as to perform a contention resolution confirmation operation at the base station.

The base station 1600 can further send a contention resolution message to the UE, where when an uplink message received by a second receiving unit includes a CCCH SDU (for example, an RRC connection request message), and a temporary C-RNTI sent by the downlink PDCCH is received: if a MAC PDU succeeds in decoding: a contention resolution timer is stopped; if the MAC PDU includes a control message unit of the contention resolution ID of the UE and this ID matches the contention resolution ID sent by the uplink, it is considered that the contention resolution succeeds, this MAC PDU is demultiplexed to extract the content in it, the temporary C-RNTI is set to a C-RNTI, and meanwhile, the temporary C-RNTI is discarded, and then it is confirmed that the random access succeeds; otherwise, the temporary C-RNTI is discarded, the UE determines that the random access fails and discards this MAC PDU; if the contention resolution timer times out, it is considered that the access fails; after the failure, a random access process is restarted according to a retreat mechanism until the number of attempts exceeds a threshold value, and then the access failure is reported to an upper-layer.

Embodiment 6

Figure 17:
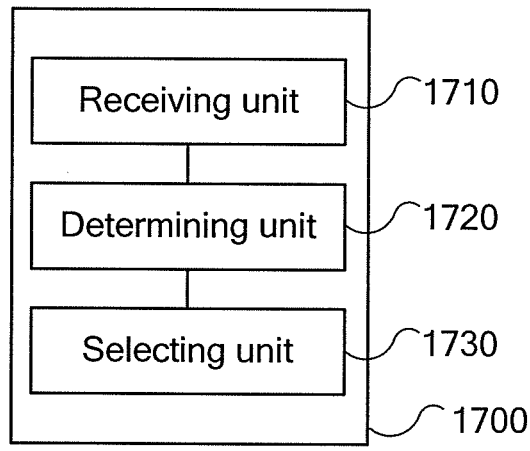
FIG. 17 is a schematic functional diagram of a user equipment according to Embodiment 6 of the present invention.

FIG. 17 is a block diagram of a user equipment according to an embodiment of the present invention. A user equipment 1700 in FIG. 17 includes a receiving unit 1710, a determining unit 1720, and a selecting unit 1730.

The receiving unit 1710 receives an indication parameter of a PRACH sequence group used by multiple base stations. The multiple base stations use a same cell identity and include a macro base station and at least one pico base station, and the indication parameter is used for indicating first PRACH sequences to sixth PRACH sequences, where the first PRACH sequences to the sixth PRACH sequences are included in the PRACH sequence group.

The determining unit 1720 determines, according to the indication parameter received by the receiving unit 1710, that the PRACH sequence group includes k1 first PRACH sequences, k2 second PRACH sequences, k3 third PRACH sequences, k4 fourth PRACH sequences, k5 fifth PRACH sequences, and k6 sixth PRACH sequences, where k1 and k4 are positive integers, and k2, k3, k5, and k6 are nonnegative integers.

The selecting unit 1730 selects a PRACH sequence from the PRACH sequence group determined by the determining unit 1720 to randomly access a network.

In the embodiments of the present invention, the PRACH sequence group used by multiple base stations includes the first PRACH sequences to the sixth PRACH sequences and is not limited to three PRACH sequences, thereby reducing the fierceness of contention access to a PRACH.

The determining unit 1720 and the selecting unit 1730 can be implemented by a processor, and the receiving unit 1710 can be implemented by a receiver or a transceiver. The user equipment 1700 in FIG. 17 can implement each step of a method shown in FIG. 4, which is not repeatedly described again so as to avoid repetition.

Optionally, in one embodiment, the selecting unit 1730 can select a PRACH sequence from the first PRACH sequence or the fourth PRACH sequence for random access of contention-based Group A; or, select a PRACH sequence from the second PRACH sequences or the fifth PRACH sequences for random access of contention-based Group B; or, select a PRACH sequence from the third PRACH sequences or the sixth PRACH sequences for non-contention based random access.

Optionally, in another embodiment, the determining unit 1720 can determine, according to a starting point identity of a first root sequence, length information of the first root sequence, a starting point identity of a second root sequence, and length information of the second root sequence which are included in the indication parameter, that the first PRACH sequences to the third PRACH sequences are based on the first root sequence and the fourth PRACH sequences to the sixth PRACH sequences are based on the second root sequence, where the length information of the first root sequence is an ending point identity of the first root sequence or the number of sequences included in the first root sequence; and the length information of the second root sequence is an ending point identity of the second root sequence or the number of sequences included in the second root sequence.

Optionally, in another embodiment, the determining unit 1720 can determine, according to a starting point identity of one root sequence and length information of the root sequence which are included in the indication parameter, that the first PRACH sequences to the sixth PRACH sequences are based on the root sequence, where the length information of the root sequence is an ending point identity of the root sequence or the number of sequences included in the root sequence.

Optionally, in another embodiment, the determining unit 1720 can further determine k1 to k6 according to k1, kx, k4, and ky which are included in the indication parameter, where kx=k1+k2, ky=k4+k5, k1+k2+k3=64, and k4+k5+k6=64, where k1 is the number of sequences of Group A, sizeOfRA-PreamblesGroupA, defined in a system information block SIB2 of the macro base station; kx is the number of contention-based sequences of the macro base station, numberOfRA-Preambles; k4 is the number of sequences of Group A, sizeOfRA-PreamblesGroupA, defined in SIB2 of the pico base station; and ky is the number of contention-based sequences of the pico base station, numberOfRA-Preambles.

Optionally, in another embodiment, the determining unit 1720 can further determine k1 to k6 according to k1, kx, k4, and ky which are included in the indication parameter, where kx=k1+k2, ky=k4+k5, k1+k2+k3=N, k4+k5+k6=K−N, K and N are positive integers, and K>N, where k1 is the number of sequences of Group A, sizeOfRA-PreamblesGroupA, defined in SIB2 of the macro base station; kx is the number of contention-based sequences of the macro base station, numberOfRA-Preambles; k4 is the number of sequences of Group A, sizeOfRA-PreamblesGroupA, defined in SIB2 of the pico base station; and ky is the number of contention-based sequences of the pico base station, numberOfRA-Preambles.

Optionally, in another embodiment, the user equipment 1700 can further implement other operations related to the user equipment in FIG. 5 to FIG. 11 (Embodiment 1 and Embodiment 2). For example, the user equipment 1700 can intercept SIB2 broadcast information sent by the base station, the SIB2 broadcast information includes a starting ID of a logical ID group of the PRACH sequence, the number of sequences of Group A and Group B numberOfRA-Preamble, and the number of sequences of Group A sizeOfRA-PreamblesGroupA.

After the selecting unit 1730 randomly selects one random PRACH sequence in one PRACH group, the user equipment 1700 can further send a PRACH sequence to the base station.

The user equipment 1700 can receive random access response (RAR) information sent by the base station, which include an index number of a PRACH sequence, time adjustment information, uplink resource scheduling information (UL grant), and a temporary RNTI.

The user equipment 1700 can send an L2/L3 layer message to the base station, that is, a user ID sent by the UE on the allocated resource on the uplink, which is L2 information, and information such as the corresponding uplink shared channel (UL-SCH) information for an RRC connection request, which is L3 information (MSG3). To implement the uplink data transmission, the UE must acquire a unique C-RNTI, and according to different user statuses, this process has different message interactions. If the PRACH contention needs to be resolved, the UE may send a contention resolution ID so as to perform a contention resolution confirmation operation at the base station. The user equipment 1700 can further receive a contention resolution message sent by the base station.

Embodiment 7

Figure 18:
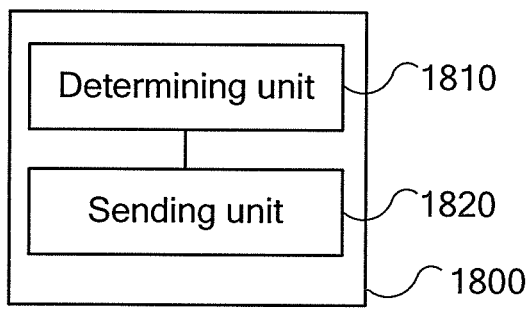
FIG. 18 is a schematic functional diagram of a base station according to Embodiment 7 of the present invention.

FIG. 18 is a block diagram of a base station according to an embodiment of the present invention. A base station 1800 of FIG. 18 includes a determining unit 1810 and a sending unit 1820.

The determining unit 1810 determines M PRACH sequence groups used by L groups of base stations, where the L groups of base stations use a same cell identity, each PRACH sequence group includes m1 first PRACH sequences, m2 second PRACH sequences, and m3 third PRACH sequences, M and L are positive integers and 1<M≤L, m1 is a positive integer, and m2 and m3 are nonnegative integers.

The sending unit 1820 sends an indication parameter of the PRACH sequence group determined by the determining unit 1810 to a UE for the UE to randomly access a network, where the indication parameter is used for indicating the first PRACH sequences to the third PRACH sequences, where the first PRACH sequences to the third PRACH sequences are included in M PRACH sequences.

In the embodiment of the present invention, the base stations are divided, and corresponding PRACH sequence groups are determined for the base stations after the division, thereby expanding the PRACH sequence resource and reducing the fierceness of the contention of the PRACH sequences.

The determining unit 1810 can be implemented by a processor, and the sending unit 1820 can be implemented by a transmitter or a transceiver. The base station 1800 in FIG. 18 can implement each step of a method shown in FIG. 12, which is not repeatedly described in detail again so as to avoid repetition.

Optionally, in one embodiment, the determining unit 1810 may determine that M PRACH sequence groups are based on one root sequence, and the indication parameter sent by the sending unit 1820 may include a starting point identity of the root sequence and length information of the root sequence. Alternatively, the determining unit 1810 can determine that M PRACH sequence groups are based on M root sequences, and the indication parameter sent by the sending unit 1820 may include starting point identities of M root sequences and length information of M root sequences. The length information of the root sequence is an ending point identity of the root sequence or the number of sequences included in the root sequence.

Optionally, in another embodiment, the indication parameter sent by the sending unit 1820 may further include m1 and mx, where mx=m1+m2, where m1 is the number of sequences of Group A, sizeOfRA-PreamblesGroupA, defined in a system information block SIB2; and mx is the number of contention-based sequences, numberOfRA-Preambles.

m1+m2+m3 of the M PRACH sequence groups may be a fixed value, for example, equal to 64. Alternatively, the values of the number of sequences of each PRACH sequence group, m1+m2+m3, can be the same or different, and the base station can separately send a corresponding value of m1+m2+m3 to the UE, for example, through a broadcast or dedicated message, so as to indicate the number of sequences of each PRACH sequence group. A specific implementation manner may be similar to an example in FIG. 8 or FIG. 9.

In the embodiment of the present invention, a manner of grouping the base stations is not limited. For example, the base stations can be divided according to geographic locations. Optionally, in another embodiment, the determining unit 1810 can multiplexes the M PRACH sequence groups in the L groups of base stations according to the geographic locations of the L groups of base stations. In this way, the total number of the PRACH sequence groups can be reduced, for example, as shown in the embodiment (Embodiment 3) in FIG. 14.

Optionally, in another embodiment, the determining unit 1810 can allocate a PRACH sequence group that includes more PRACH sequences to a group of base stations that belong to a high contention area and are in the L groups of base stations; and alternatively, allocate a PRACH sequence group that includes fewer PRACH sequences to a group of base stations that belong to a low contention area and are in the L groups of base stations. In this way, the fierceness of the contention of the PRACH sequences can be controlled better, for example, as shown in the embodiment (Embodiment 4) in FIG. 15.

Optionally, in another embodiment, the indication parameter sent by the sending unit 1820 is further used for indicating identity information of a base station which corresponds to each PRACH sequence group.

Optionally, in another embodiment, the base station 1800 can further implement other operations related to the base station in FIG. 5 to FIG. 11 (Embodiment 1 and Embodiment 2). For example, the base station 1800 may send SIB2 broadcast information to the user equipment, and the SIB2 broadcast information includes a starting ID of a logical ID group of a PRACH sequence, the number of sequences of Group A and Group B numberOfRA-Preamble, and the number of sequences of Group A sizeOfRA-Preambles-GroupA. The base station 1600 can further receive a PRACH sequence sent by the user equipment.

The base station 1800 can further send a random access response (RAR) to the user equipment. After detecting a PRACH sequence sent by the user equipment, the base station 1800 sends the foregoing RAR on a downlink shared channel (DL-SCH), which includes: an index number of the PRACH sequence, time adjustment information, uplink resource scheduling information (UL grant), and a temporary RNTI, which is used for the user equipment to intercept a corresponding PDCCH channel in a subsequent exchange process.

The base station 1800 can further receive L2/L3 information sent by the UE, that is, receive a user ID sent by the UE on the allocated resource on the uplink, which is L2 information, and information such as the corresponding uplink shared channel (UL-SCH) information used for an RRC connection request, which is L3 information (MSG3). To implement the uplink data transmission, the UE must acquire a unique C-RNTI, and according to different user statuses, this process has different message interactions. If the PRACH contention needs to be resolved, the UE may send a contention resolution ID so as to perform a contention resolution confirmation operation at the base station.

The base station 1800 can further send a contention resolution message to the UE. When an uplink message received by a second receiving unit includes a CCCH SDU (for example, an RRC connection request message) and a temporary C-RNTI sent by a downlink PDCCH is received: if a MAC PDU succeeds in decoding: a contention resolution timer is stopped; if the MAC PDU includes a control message unit of the contention resolution ID of the UE and this ID matches the contention resolution ID sent by the uplink, it is considered that the contention resolution succeeds, and this MAC PDU is demultiplexed to extract the content in it, the temporary C-RNTI is set to a C-RNTI, meanwhile, the temporary C-RNTI is discarded, and it is confirmed that the random access succeeds; otherwise, the temporary C-RNTI is discarded, the UE determines that the random access fails and discards this MAC PDU; if the contention resolution timer times out, it is considered that the access fails; after the failure, a random access process is restarted according to a retreat mechanism until the number of attempts exceeds a threshold value, and then an access failure is reported to an upper-layer.

Embodiment 8

Figure 19:
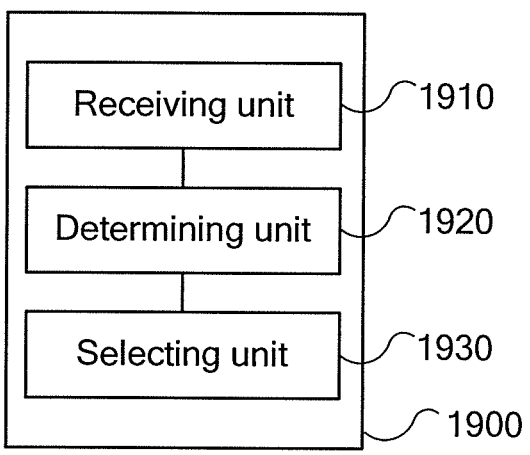
FIG. 19 is a schematic functional diagram of a user equipment according to Embodiment 8 of the present invention.

FIG. 19 is a block diagram of a user equipment according to an embodiment of the present invention. A user equipment

1900 in FIG. 19 includes a receiving unit 1910, a determining unit 1920, and a selecting unit 1930.

The receiving unit 1910 receives an indication parameter of M PRACH sequence groups used by L groups of base stations. The L groups of base stations use a same cell identity. The indication parameter is used for indicating first PRACH sequences to third PRACH sequences, where the first PRACH sequences to the third PRACH sequences are included in each PRACH sequence group.

The determining unit 1920 determines, according to the indication parameter, that each PRACH sequence group includes m1 first PRACH sequences, m2 second PRACH sequences, and m3 third PRACH sequences, where M and L are positive integers and $1<M\leq L$, m1 is a positive integer, and m2 and m3 are nonnegative integers.

The selecting unit 1930 selects a PRACH sequence from a PRACH sequence group to randomly access a network.

In the embodiment of the present invention, the base stations are divided, and corresponding PRACH sequence groups are determined for the base stations after the division, thereby expanding the PRACH sequence resource and reducing the fierceness of the contention of the PRACH sequences.

The determining unit 1920 and the selecting unit 1930 can be implemented by a processor, and the receiving unit 1910 can be implemented by a receiver or a transceiver. The user equipment 1900 in FIG. 19 can implement each step of a method in FIG. 13, which is not repeatedly described in detail again so as to avoid repetition.

Optionally, in one embodiment, the determining unit 1920 can determine, according to a starting point identity of one root sequence and length information of the root sequence which are included in the indication parameter, that M PRACH sequence groups are based on the root sequence; and alternatively, determine according to starting point identities of M root sequences and length information of the M root sequences, that each PRACH sequence group among the M PRACH sequence groups is based on one root sequence among the M root sequences, where the starting point identities of the M root sequences and the length information of the M root sequences are included in the indication parameter. The length information of the root sequence is an ending point identity of the root sequence or the number of sequences included in the root sequence.

Optionally, in another embodiment, the determining unit 1920 can further determine m1, m2, and m3 according to m1 and mx which are included in the indication parameter, where mx=m1+m2, where m1 is the number of sequences of Group A, sizeOfRA-PreamblesGroupA, defined in a system information block SIB2; and mx is the number of contention-based sequences, numberOfRA-Preambles.

m1+m2+m3 of the M PRACH sequence groups may be a fixed value, for example, equal to 64. Alternatively, the values of the number of sequences of each PRACH sequence group, m1+m2+m3, can be the same or different, and the base station can separately send a corresponding value of m1+m2+m3 to the UE, for example, through a broadcast or dedicated message, so as to indicate the number of sequences of each PRACH sequence group. A specific implementation manner may be similar to an example in FIG. 8 or FIG. 9.

Optionally, in another embodiment, the user equipment 1900 can further implement other operations related to the user equipment in FIG. 5 to FIG. 11 (Embodiment 1 and Embodiment 2). For example, the user equipment 1900 can intercept SIB2 broadcast information sent by the base station, the SIB2 broadcast information includes a starting ID of a logical ID group of a PRACH sequence, the number of sequences of Group A and Group B numberOfRA-Preamble, and the number of sequences of Group A sizeOfRA-PreamblesGroupA.

After the selecting unit 1930 randomly selects one random PRACH sequence in one PRACH group, the user equipment 1900 can further send the PRACH sequence to the base station.

The user equipment 1900 can receive random access response (RAR) information sent by the base station, which includes an index number of the PRACH sequence, time adjustment information, uplink resource scheduling information (UL grant), and a temporary RNTI.

The user equipment 1900 can send an L2/L3 layer message to the base station, that is, a user ID sent by the UE on the allocated resource on the uplink, which is L2 information, and information such as the corresponding uplink shared channel (UL-SCH) information used for an RRC connection request, which is L3 information (MSG3). To implement the uplink data transmission, the UE must acquire a unique C-RNTI, and according to different user statuses, this process has different message interactions. If the PRACH contention needs to be resolved, the UE may send a contention resolution ID so as to perform a contention resolution confirmation operation at the base station. The user equipment 1900 can further receive a contention resolution message sent by the base station.

A communication system according to the embodiment of the present invention may include the foregoing base station 1600 and user equipment 1700, or include the foregoing base station 1800 and user equipment 1900.

In the embodiments of the present invention, the UE in a non-connected status intercepts SIB2 broadcast information to acquire an ID of a PRACH base sequence of a radio cell, the UE sends the PRACH sequence to the base station and/or several RRHs, the base station and/or several RRHs send random access response (RAR) information to the UE after receiving a PRACH signal sent by the UE, the UE sends an L2/L3 message to the base station and/or several RRHs after receiving the RAR information, and the base station and/or multiple RRHs decide a UE that succeeds in the PRACH contention, and send the information representing that the PRACH contention succeeds to the UE. In the entire process of the embodiment, the advantages of the present invention are embodied as follows: several RRHs participate in the reception of the PRACH sequence and participate in the judgment of the PRACH contention, thereby increasing the capacity of the uplink PRACH and reducing the fierceness that multiple RRHs participate in the PRACH contention; moreover, a PRACH ID group can be flexibly configured, thereby greatly saving a PRACH ID resource, and it is guaranteed that the UE in a non-connected status can access the base station and/or several RRHs well.

Persons of ordinary skill in the art may be aware that each exemplary unit and algorithm step described in combination with the embodiments disclosed in this specification can be implemented by electronic hardware, or a combination of computer software and electronic hardware. Whether these functions are executed in a manner of hardware or software depends on particular applications and design constraint conditions of the technical solutions. Persons skilled in the art can use different methods to implement the described functions for every particular application, but the implementation should not be considered as going beyond the scope of the present invention.

It can be clearly understood by persons skilled in the art that, for the purpose of convenient and brief description, for a detailed working process of the foregoing described system, apparatus, and unit, reference may be made to the corresponding process in the foregoing method embodiments, which is not repeatedly described here again.

In the several embodiments provided in the application, it should be understood that the disclosed system, apparatus, and method may be implemented through another manner. For example, the foregoing described apparatus embodiments are merely exemplary. For example, the division of the units is merely a logical functional division and may be another division manner in actual implementation. For example, multiple units or components can be combined or can be integrated into another system, or some features can be ignored or not performed. In addition, the displayed or discussed mutual couplings or direct couplings or communication connections are implemented through some interfaces. The indirect couplings or communication connections between the apparatuses or units may be implemented in electronic, mechanical, or other forms.

The units described as separate parts may be or may not be physically separate, and parts displayed as units may be or may not be physical units, and may be located in one location, or may also be distributed onto multiple network elements. A part or all of the units may be selected according to actual needs to achieve the objectives of the solutions of the embodiments.

In addition, each function unit in each embodiment of the present invention may be integrated into a processing unit, and may also be each unit which exists alone physically, and two or more units may also be integrated into one unit.

If being implemented in a form of a software functional unit and sold or used as a stand-alone product, the functions may be stored in a computer-readable storage medium. Based on such understanding, the technical solutions of the present invention essentially or a part that makes contributions to the prior art, or a part of the technical solution may be embodied in a foam of a software product. The computer software product is stored in a storage medium, and includes several instructions which is used to make a computer device (which may be a personal computer, a server, or a network device) to execute all or a part of steps of the method in each embodiment of the present invention. The foregoing storage medium may be various medium that is capable of storing program codes, including a USB disk, a removable hard disk, a read-only memory (ROM), a random access memory (RAM), a magnetic disk, or a compact disk.

What is claimed is:

1. A method for accessing a physical random access channel (PRACH), the method comprising:
    determining a PRACH sequence group used by multiple base stations, wherein the multiple base stations use a same cell identity and comprise a macro base station and at least one pico base station, the PRACH sequence group based on two root sequences, a first root sequence associated with the macro base station and a second root sequence associated with the pico base station, the PRACH sequence group comprises k1 first PRACH sequences, k2 second PRACH sequences, k3 third PRACH sequences, k4 fourth PRACH sequences, k5 fifth PRACH sequences, and K6 sixth PRACH sequences, k1 and K4 are positive integers, and k2, k3, k5, and k6 are nonnegative integers, wherein the first PRACH sequences to the third PRACH sequences are based on the first root sequence and the fourth PRACH sequences to the sixth PRACH sequences are based on the second root sequence; and
    sending an indication parameter of the PRACH sequence group to a user equipment UE for the UE to randomly access a network, wherein the indication parameter is used for indicating the first PRACH sequences to the sixth PRACH sequences.

2. The access method according to claim 1, wherein the first PRACH sequences and the fourth PRACH sequences are PRACH sequences of contention-based Group A, the second PRACH sequences and the fifth PRACH sequences are PRACH sequences of contention-based Group B, and the third PRACH sequences and the sixth PRACH sequences are non-contention based PRACH sequences.

3. The access method according to claim 1, wherein the indication parameter comprises a starting point identity of the first root sequence, length information of the first root sequence, a starting point identity of the second root sequence, and length information of the second root sequence, wherein the access method further comprises any of:
    the length information of the first root sequence is an ending point identity of the first root sequence or the number of sequences comprised in the first root sequence; and the length information of the second root sequence is an ending point identity of the second root sequence or the number of sequences comprised in the second root sequence; and,
    the first and second root sequences are combined such that the first PRACH sequences to the sixth PRACH sequences are based on one root sequence, the one root sequence divided into macro and pico sequences, and the indication parameter comprises a starting point identity of the one root sequence and length information of the one root sequence, wherein the length information of the one root sequence is an ending point identity of the one root sequence or the number of sequences comprised in the one root sequence.

4. The access method according to claim 3, wherein K is a total number of PRACH sequences included in the PRACH sequence group such that k1+k2+k3=N, k4+k5+k6=K−N, K and N are positive integers, and K>N; and the indication parameter further comprises k1, kx,k4, and ky, wherein kx=k1+k2, ky=k4+k5, wherein k1 is the number of sequences of Group A, defined in system information (SIB2) of the macro base station; kx is the number of contention-based sequences of the macro base station, k4 is the number of sequences of Group A, defined in SIB2 of the pico base station; and ky is the number of contention-based sequences of the pico base station.

5. The access method according to claim 1, wherein,
    the first PRACH sequences to the third PRACH sequences are used for random access to the macro base station or the pico base station, and the fourth PRACH sequences to the sixth PRACH sequences are used for random access to the pico base station.

6. A method for accessing a physical random access channel (PRACH), the method comprising:
    receiving an indication parameter of a PRACH sequence group used by multiple base stations, wherein the multiple base stations use a same cell identity and comprise a macro base station and at least one pico base station, the PRACH sequence group based on two root sequences, a first root sequence associated with the macro base station and a second root sequence associated with the pico base station, and the indication parameter is used for indicating first PRACH sequences to sixth PRACH sequences, wherein the first PRACH sequences to the sixth PRACH sequences are comprised in the PRACH sequence group;
determining, according to the indication parameter, that the PRACH sequence group comprises k1 first PRACH sequences, k2 second PRACH sequences, k3 third PRACH sequences, k4 fourth PRACH sequences, k5 fifth PRACH sequences, and k6 sixth PRACH sequences, wherein k1 and k4 are positive integers, and k2, k3, k5, and k6 are nonnegative integers, wherein the first PRACH sequences to the third PRACH sequences are based on the first root sequence and the fourth PRACH sequences to the sixth PRACH sequences are based on the second root sequence; and
selecting a PRACH sequence from the PRACH sequence group to randomly access a network.

7. The access method according to claim 6, wherein the selecting the PRACH sequence from the PRACH sequence group to randomly access the network comprises any of:
selecting the PRACH sequence from the first PRACH sequences or the fourth PRACH sequences to randomly access the network, wherein the selected PRACH sequence is a sequence of contention-based Group A;
selecting the PRACH sequence from the second PRACH sequences or the fifth PRACH sequences to randomly access the network, wherein the selected PRACH sequence is a sequence of contention-based Group B; and
selecting the PRACH sequence from the third PRACH sequences or the sixth PRACH sequences to randomly access the network, wherein the selected PRACH sequence is a non-contention based PRACH sequence.

8. The access method according to claim 6, wherein the indication parameter comprises a starting point identity of a first root sequence, length information of the first root sequence, a starting point identity of a second root sequence, and length information of the second root sequence; the determining, according to the indication parameter, that the PRACH sequence group comprises k1 first PRACH sequences, k2 second PRACH sequences, k3 third PRACH sequences, k4 fourth PRACH sequences, k5 fifth PRACH sequences, and k6 sixth PRACH sequences comprises any of:
determining, according to a starting point identity of a first root sequence, length information of the first root sequence, a starting point identity of a second root sequence, and length information of the second root sequence which are comprised in the indication parameter, that the first PRACH sequences to the third PRACH sequences are based on the first root sequence, and the fourth PRACH sequences to the sixth PRACH sequences are based on the second root sequence,
wherein the length information of the first root sequence is an ending point identity of the first root sequence or the number of sequences comprised in the first root sequence; and the length information of the second root sequence is an ending point identity of the second root sequence or the number of sequences comprised in the second root sequence; and,
wherein the first and second root sequences are combined such that the first PRACH sequences to the sixth PRACH sequences are based on one root sequence, the one root sequence divided into macro and pico sequences, the indication parameter comprises a starting point identity of the one root sequence and length information of the one root sequence; the determining, according to the indication parameter, that the PRACH sequence group comprises k1 first PRACH sequences, k2 second PRACH sequences, k3 third PRACH sequences, k4 fourth PRACH sequences, k5 fifth PRACH sequences, and k6 sixth PRACH sequences comprises:
determining, according to a starting point identity of the one root sequence and length information of the one root sequence which are comprised in the indication parameter, that the first PRACH sequences to the sixth PRACH sequences are based on the one root sequence,
wherein the length information of the root sequence is an ending point identity of the root sequence or the number of sequences comprised in the root sequence.

9. The access method according to claim 8, wherein the indication parameter further comprises k1, kx, k4, and ky; the determining, according to the indication parameter, that the PRACH sequence group comprises k1 first PRACH sequences, k2 second PRACH sequences, k3 third PRACH sequences, k4 fourth PRACH sequences, k5 fifth PRACH sequences, and k6 sixth PRACH sequences further comprises:
determining k1 to k6 according to k1, kx, k4, and ky which are comprised in the indication parameter, wherein kx=k1+k2, ky=k4+k5, k1+k2+k3=N, k4+k5+k6=K-N, K and N are positive integers and K>N with K being a total number of PRACH sequences included in the PRACH sequence group, wherein k1 is the number of sequences of Group A, defined in a system information block (SIB2) of the macro base station; kx is the number of contention-based sequences of the macro base station, k4 is the number of sequences of Group A, defined in a system information block (SIB2) of the pico base station; and ky is the number of contention-based sequences of the pico base station.

10. The access method according to claim 6, wherein the selecting a PRACH sequence from the PRACH sequence group to randomly access a network, comprises any of:
selecting the PRACH sequence from the first PRACH sequences to the third PRACH sequences for random access to the macro base station or the pico base station; and,
selecting the PRACH sequence from the fourth PRACH sequences to the sixth PRACH sequences for random access to the pico base station.

11. A method for accessing a physical random access channel PRACH, the method comprising:
determining M PRACH sequence groups used by L groups of base stations, wherein the L groups of base stations use a same cell identity, each PRACH sequence group of the M PRACH sequence groups comprises m1 first PRACH sequences, m2 second PRACH sequences, and m3 third PRACH sequences, M and L are positive integers and 1<M≤L, m1 is a positive integer, and m2 and m3 are nonnegative integers; and
multiplexing the M PRACH sequence groups in the L groups of base stations according to geographic locations of the L groups of base stations;
sending an indication parameter of the PRACH sequence group to a user equipment UE for the UE to randomly access a network, wherein the indication parameter is used for indicating the first PRACH sequences to the third PRACH sequences, wherein the first PRACH sequences to the third PRACH sequences are comprised in each PRACH sequence group of the M PRACH sequence groups.

12. The method according to claim 11, wherein the determining the M PRACH sequence groups used by the L groups of base stations comprises any of:
determining that the M PRACH sequence groups are based on one root sequence, wherein the indication parameter comprises a starting point identity of the root sequence and length information of the root sequence; and,
determining that the M PRACH sequence groups are based on M root sequences, wherein the indication parameter comprises starting point identities of the M root sequences and length information of the M root sequences,
wherein the length information of the root sequence is an ending point identity of the root sequence or the number of sequences comprised in the root sequence.

13. The method according to claim 12, wherein the indication parameter further comprises m1 and mx, wherein mx =m1+m2, m1 is the number of sequences of Group A, defined in a system information block (SIB2); and mx is the number of contention-based sequences.

14. The method according to claim 11, wherein the determining the M PRACH sequence groups used by the L groups of base stations comprises any of:
allocating a PRACH sequence group that comprises more PRACH sequences to a group of base stations that belong to a high contention area and are in the L groups of base stations; and
allocating a PRACH sequence group that comprises fewer PRACH sequences to a group of base stations that belong to a low contention area and are in the L groups of base stations.

15. The method according to claim 11, wherein the indication parameter is further used for indicating identity information of a base station which corresponds to each PRACH sequence group.

16. A method for accessing a physical random access channel PRACH, the method comprising:
receiving an indication parameter of M PRACH sequence groups used by L groups of base stations, wherein the L groups of base stations use a same cell identity, and the indication parameter is used for indicating first PRACH sequences to third PRACH sequences, wherein the first PRACH sequences to the third PRACH sequences are comprised in each PRACH sequence group of the M PRACH sequence groups;
multiplexing the M PRACH sequence groups in the L groups of base stations according to geographic locations of the L groups of base stations;
determining, according to the indication parameter, that each PRACH sequence group comprises m1 first PRACH sequences, m2 second PRACH sequences, and m3 third PRACH sequences, wherein M and L are positive integers and 1 <M<L, m1 is a positive integer, and m2 and m3 are nonnegative integers; and
selecting a PRACH sequence from the PRACH sequence group to randomly access a network.

17. The method according to claim 16, wherein the determining, according to the indication parameter, that each PRACH sequence group comprises m1 first PRACH sequences, m2 second PRACH sequences, and m3 third PRACH sequences comprises any of:
determining, according to a starting point identity of one root sequence and length information of the root sequence which are comprised in the indication parameter, that the M PRACH sequence groups are based on the root sequence; and,
determining, according to starting point identities of M root sequences and length information of the M root sequences, that each PRACH sequence group among the M PRACH sequence groups is based on one root sequence among the M root sequences, wherein the starting point identities of the M root sequences and the length information of the M root sequences are comprised in the indication parameter,
wherein the length information of the root sequence is an ending point identity of the root sequence or the number of sequences comprised in the root sequence.

18. The method according to claim 17, wherein the indication parameter further comprises m1 and mx, the determining, according to the indication parameter, that each PRACH sequence group comprises m1 first PRACH sequences, m2 second PRACH sequences, and m3 third PRACH sequences further comprises:
determining m1, m2, and m3 according to m1 and mx which are comprised in the indication parameter, wherein mx=m1+m2, wherein m1 is the number of sequences of Group A, defined in a system information block (SIB2); and mx is the number of contention-based sequences.

19. A base station, comprising:
a determining unit, configured to determine a physical random access channel PRACH sequence group used by multiple base stations, wherein the multiple base stations use a same cell identity and comprise a macro base station and at least one pico base station, the PRACH sequence group based on two root sequences, a first root sequence associated with the macro base station and a second root sequence associated with the pico base station, the PRACH sequence group comprises k1 first PRACH sequences, k2 second PRACH sequences, k3 third PRACH sequences, k4 fourth PRACH sequences, k5 fifth PRACH sequences, and k6 sixth PRACH sequences, wherein k1 and k4 are positive integers, and k2, k3 , k5, and k6 are nonnegative integers, wherein the first PRACH sequences to the third PRACH sequences are based on the first root sequence and the fourth PRACH sequences to the sixth PRACH sequences are based on the second root sequence; and
a sending unit, configured to send an indication parameter of the PRACH sequence group determined by the determining unit, to a user equipment UE for the UE to randomly access a network, wherein the indication parameter is used for indicating the first PRACH sequences to the sixth PRACH sequences.

20. A base station, comprising:
a determining unit, configured to determine a physical random access channel PRACH sequence group used by multiple base stations, wherein the multiple base stations use a same cell identity and comprise a macro base station and at least one pico base station, the PRACH sequence group comprises k1 first PRACH sequences, k2 second PRACH sequences, k3 third PRACH sequences, k4 fourth PRACH sequences, k5 fifth PRACH sequences, and k6 sixth PRACH sequences, wherein k1 and k4 are positive integers, and k2, k3 , k5, and k6 are nonnegative integers; and
a sending unit, configured to send an indication parameter of the PRACH sequence group determined by the determining unit, to a user equipment UE for the UE to randomly access a network, wherein the indication parameter is used for indicating the first PRACH sequences to the sixth PRACH sequences;

wherein the first PRACH sequences and the fourth PRACH sequences, determined by the determining unit, are PRACH sequences of contention-based Group A, the second PRACH sequences and the fifth PRACH sequences are PRACH sequences of contention-based Group B, and the third PRACH sequences and the sixth PRACH sequences are non-contention based PRACH sequences.

21. The base station according to claim 19, wherein the indication parameter, sent by the sending unit, comprises any of:
a starting point identity of the first root sequence, length information of the first root sequence, a starting point identity of the second root sequence, and length information of the second root sequence, wherein the length information of the first root sequence is an ending point identity of the first root sequence or the number of sequences comprised in the first root sequence; and the length information of the second root sequence is an ending point identity of the second root sequence or the number of sequences comprised in the second root sequence; and,
the first and second root sequences are combined such that the first PRACH sequences to the sixth PRACH sequences, determined by the determining unit, are based on one root sequence, the one root sequence divided into macro and pico sequences;
the indication parameter, sent by the sending unit, comprises a starting point identity of the one root sequence and length information of the one root sequence, wherein the length information of the one root sequence is an ending point identity of the one root sequence or the number of sequences comprised in the one root sequence.

22. The base station according to claim 21, wherein K is a total number of PRACH sequences included in the PRACH sequence group such that k1+k2+k3=N, k4+k5+k6=K-N, K and N are positive integers and K>N; the indication parameter, sent by the sending unit, further comprises k1, kx, k4, and ky, wherein kx=k1+k2, ky=k4+k5, wherein k1 is the number of sequences of Group A, defined in a system information block (SIB2) of the macro base station; kx is the number of contention-based sequences of the macro base station, k4 is the number of sequences of Group A, defined in a system information block (SIB2) of the pico base station; and ky is the number of contention-based sequences of the pico base station.

23. The base station according to claim 19, wherein the first PRACH sequences to the third PRACH sequences, determined by the determining unit, are used for random access to the macro base station or the pico base station, and the fourth PRACH sequences to the sixth PRACH sequences, determined by the determining unit, are used for random access to the pico base station.

24. A user equipment, comprising:
a receiving unit, configured to receive an indication parameter of a physical random access channel PRACH sequence group used by multiple base stations, wherein the multiple base stations use a same cell identity and comprise a macro base station and at least one pico base station, the PRACH sequence group based on two root sequences, a first root sequence associated with the macro base station and a second root sequence associated with the pico base station, and the indication parameter is used for indicating first PRACH sequences to sixth PRACH sequences, wherein the first PRACH sequences to the sixth PRACH sequences are comprised in the PRACH sequence group;
a determining unit, configured to determine, according to the indication parameter received by the receiving unit, that the PRACH sequence group comprises k1 first PRACH sequences, k2 second PRACH sequences, k3 third PRACH sequences, k4 fourth PRACH sequences, k5 fifth PRACH sequences, and k6 sixth PRACH sequences, wherein k1 and k4 are positive integers, and k2, k3, k5, and k6 are nonnegative integers, wherein the first PRACH sequences to the third PRACH sequences are based on the first root sequence and the fourth PRACH sequences to the sixth PRACH sequences are based on the second root sequence; and
a selecting unit, configured to select a PRACH sequence from the PRACH sequence group determined by the determining unit to randomly access a network.

25. The user equipment according to claim 24, wherein the selecting unit is specifically configured to select any of:
the PRACH sequence from the first PRACH sequences or the fourth PRACH sequences to randomly access the network, wherein the selected PRACH sequence is a sequence of contention-based Group A;
the PRACH sequence from the second PRACH sequences or the fifth PRACH sequences to randomly access the network, wherein the selected PRACH sequence is a sequence of contention-based Group B; and
the PRACH sequence from the third PRACH sequences or the sixth PRACH sequences to randomly access the network, wherein the selected PRACH sequence is a non-contention based PRACH sequence.

26. The user equipment according to claim 24, wherein the determining unit is specifically configured to determine any of:
according to a starting point identity of a first root sequence, length information of the first root sequence, a starting point identity of a second root sequence, and length information of the second root sequence which are comprised in the indication parameter, wherein the length information of the first root sequence is an ending point identity of the first root sequence or the number of sequences comprised in the first root sequence; and the length information of the second root sequence is an ending point identity of the second root sequence or the number of sequences comprised in the second root sequence; and,
according to a starting point identity of one root sequence and length information of the one root sequence which are comprised in the indication parameter, the first and second root sequences are combined into the one root sequence such that the first PRACH sequences to the sixth PRACH sequences are based on the one root sequence, wherein the length information of the one root sequence is an ending point identity of the one root sequence or the number of sequences comprised in the one root sequence, the one root sequence divided into macro and pica sequences.

27. The user equipment according to claim 26, wherein the determining unit is further configured to determine k1 to k6 according to k1, kx, k4, and ky which are further comprised in the indication parameter, wherein kx=k1+k2, ky=k4+k5, k1+k2+k3=N, k4+k5+k6=K-N, K and N are positive integers and K>N with K being a total number of PRACH sequences included in the PRACH sequence group, wherein k1 is the number of sequences of Group A, defined in a system information block (SIB2) of the macro base station; kx is the number of contention-based sequences of the macro base station, k4 is the number of sequences of Group A, defined in a system information block (SIB2) of the pico base station; and ky is the number of contention-based sequences of the pico base station.

28. A base station, comprising:

a determining unit, configured to determine M physical random access channel PRACH sequence groups used by L groups of base stations, wherein the L groups of base stations use a same cell identity, each PRACH sequence group of the M PRACH sequence groups comprises m1 first PRACH sequences, m2 second PRACH sequences, and m3 third PRACH sequences, M and L are positive integers and 1<M<L, m1 is a positive integer, and m2 and m3 are nonnegative integers, the M PRACH sequence groups multiplexed in the L groups of base stations according to geographic locations of the L groups of base stations; and a sending unit, configured to send an indication parameter of the PRACH sequence group determined by the determining unit to a user equipment UE for the UE to randomly access a network, wherein the indication parameter is used for indicating the first PRACH sequences to the third PRACH sequences, wherein the first PRACH sequences to the third PRACH sequences are comprised in the M PRACH sequences.

29. The base station according to claim 28, wherein the determining unit is specifically configured to determine any of:

that the M PRACH sequence groups are based on one root sequence, and the indication parameter sent by the sending unit comprises a starting point identity of the root sequence and length information of the root sequence; and, that the M PRACH sequence groups are based on M root sequences, and the indication parameter sent by the sending unit comprises starting point identities of the M root sequences and length information of the M root sequences, wherein the length information of the root sequence is an ending point identity of the root sequence or the number of sequences comprised in the root sequence.

30. The base station according to claim 29, wherein the indication parameter sent by the sending unit further comprises m1 and mx, wherein mx=m1+m2, m1 is the number of sequences of Group A, defined in a system information block (SIB2); and mx is the number of contention-based sequences.

31. The base station according to claim 28, wherein the determining unit is specifically configured to allocate any of:

a PRACH sequence group that comprises more PRACH sequences to a group of base stations that belong to a high contention area and are in the L groups of base stations; and a PRACH sequence group that comprises fewer PRACH sequences to a group of base stations that belong to a low contention area and are in the L groups of base stations.

32. The base station according to claim 28, wherein the indication parameter sent by the sending unit is further configured to indicate identity information of a base station which corresponds to each PRACH sequence group.

33. A user equipment, comprising:

a receiving unit, configured to receive an indication parameter of M physical random access channel PRACH sequence groups used by L groups of base stations, wherein the L groups of base stations use a same cell identity, and the indication parameter is used for indicating first PRACH sequences to third PRACH sequences, wherein the first PRACH sequences to the third PRACH sequences are comprised in each PRACH sequence group of the M PRACH sequence groups, the M PRACH sequence groups multiplexed in the L groups of base stations according to geographic locations of the L groups of base stations;

a determining unit, configured to determine, according to the indication parameter, that each PRACH sequence group comprises m1 first PRACH sequences, m2 second PRACH sequences, and m3 third PRACH sequences, wherein M and L are positive integers and 1<M<L, m1 is a positive integer, and m2 and m3 are nonnegative integers; and a selecting unit, configured to select a PRACH sequence from the PRACH sequence group to randomly access a network.

34. The user equipment according to claim 33, wherein the determining unit is specifically configured to determine any of:

according to a starting point identity of one root sequence and length information of the root sequence which are comprised in the indication parameter, that the M PRACH sequence groups are based on the root sequence; and, according to starting point identities of M root sequences and length information of the M root sequences, that each PRACH sequence group among the M PRACH sequence groups is based on one root sequence among the M root sequences, wherein the starting point identities of the M root sequences and the length information of the M root sequences are comprised in the indication parameter, wherein the length information of the root sequence is an ending point identity of the root sequence or the number of sequences comprised in the root sequence.

35. The user equipment according to claim 34, wherein the determining unit is further configured to determine m1, m2, and m3 according to m1 and mx which are further comprised in the indication parameter, wherein mx=m1+m2, m1 is the number of sequences of Group A, defined in a system information block (SIB2); and mx is the number of contention-based sequences.

* * * * *